(12) United States Patent
Higuchi et al.

(10) Patent No.: US 7,065,269 B2
(45) Date of Patent: Jun. 20, 2006

(54) OPTICAL MULTIPLEXER/DEMULTIPLEXER, OPTICAL INTEGRATED CIRCUIT AND LIGHT TRANSCEIVER USING THE SAME

(75) Inventors: Masayoshi Higuchi, Kyoto (JP); Hayami Hosokawa, Kyoto (JP); Hiroyuki Fujiwara, Kyotanabe (JP); Kazuyuki Hayamizu, Kyotanabe (JP); Yoshiyuki Komura, Kyoto (JP); Akira Enami, Nara (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/887,699

(22) Filed: Jul. 9, 2004

(65) Prior Publication Data

US 2005/0008281 A1 Jan. 13, 2005

(30) Foreign Application Priority Data

Jul. 11, 2003 (JP) ............................. 2003/196091
May 17, 2004 (JP) ............................. 2004/147034

(51) Int. Cl.
G02B 6/26 (2006.01)
G02B 6/28 (2006.01)

(52) U.S. Cl. .......................................... 385/24; 385/19
(58) Field of Classification Search ................. 385/19, 385/24
See application file for complete search history.

(56) References Cited

U.S. PATENT DOCUMENTS

| 4,958,897 | A | | 9/1990 | Yanagawa et al. |
| 5,457,558 | A | * | 10/1995 | Yokoyama ................. 398/181 |
| 5,649,037 | A | | 7/1997 | Ohyama et al. |
| 5,764,825 | A | | 6/1998 | Mugino et al. |
| 6,408,121 | B1 | | 6/2002 | Goto |
| 6,744,945 | B1 | * | 6/2004 | Kinoshita et al. ............ 385/24 |
| 6,782,155 | B1 | * | 8/2004 | Katayama et al. ............ 385/19 |
| 2002/0071633 | A1 | * | 6/2002 | Kimura ....................... 385/24 |
| 2003/0007754 | A1 | | 1/2003 | Terashima |

FOREIGN PATENT DOCUMENTS

EP 0778478 A2 6/1997

(Continued)

OTHER PUBLICATIONS

Patent Abstracts of Japan dated Nov. 10, 1984 for Publication No. 59198408.

(Continued)

*Primary Examiner*—Michelle Connelly-Cushwa
*Assistant Examiner*—Tina M Wong
(74) *Attorney, Agent, or Firm*—Osha Liang LLP

(57) ABSTRACT

An optical multiplexer/demultiplexer having a high isolation characteristic, a small polarization dependency and capable of being reduced in size is disclosed. An end portion of a core and an end portion of a core are arranged in opposed relation to each other with a thin-film filter interposed therebetween. The end portion of the core far from the filter and the end portion of the core far from the filter are arranged in substantially parallel to each other. The core is arranged in such a manner as to branch from the filter-side end portion of the core and to be optically coupled with the core. The end portion of the core near to the filter and the end portion of the core near to the filter are curved. The end portion of the core near to the filter is curved in a manner protruded toward the core. The end portion of each of the core and the core far from the filter reaches an end of an optical waveguide, and the end portion of the core far from the filter reaches a side of the optical waveguide.

18 Claims, 33 Drawing Sheets

FOREIGN PATENT DOCUMENTS

| | | |
|---|---|---|
| EP | 0778478 A3 | 6/1997 |
| EP | 0977061 A2 | 2/2000 |
| EP | 0977061 A3 | 2/2000 |
| FR | 2595477 A1 | 9/1987 |
| FR | 2661253 A1 | 10/1991 |
| FR | 2816062 A1 | 5/2002 |
| JP | 59198408 | 11/1984 |
| JP | 62-098305 | 5/1987 |
| JP | 5-232322 | 9/1993 |
| JP | 8-054533 | 2/1996 |
| JP | 8-190026 A1 | 7/1996 |
| JP | 11-295538 | 10/1999 |
| JP | 0977361 A2 | 2/2000 |
| JP | 2002-090560 | 3/2002 |
| WO | WO-2004/051329 A1 | 6/2004 |

OTHER PUBLICATIONS

Partial European Search Report dated Nov. 3, 2004; Appl. No. 04103030.5-2216, (7 pages).

Han-Hun Koh, et al., "On-wafer Process for Mass Production of Hybridly Integrated Optical Components Using Passive Alignment on Silicon Motherboard", 1999 Electronic Components and Technology Conference, pp. 216-221.

Patent Abstracts of Japan, Publication No. 08-054533 dated Feb. 27, 1996, 2 pages.

Patent Abstracts of Japan, Publication No. 11-295538 dated Oct. 29, 1999, 2 pages.

International Search Report dated Mar. 5, 2003; Int'l Appl. No. PCT/JP03/01511: (4 pages).

Communication from EPO dated Feb. 2, 2005 (3 pages) including European Search Report dated Jan. 13, 2005; Appl. No. EP 04 10 3030; (5 pages).

Patent Abstracts of Japan for Publ. No. 2002090560 dated Mar. 27, 2002 (1 page).

Patent Abstracts of Japan for Publ. No. 05232322 dated Sep. 10, 2003 (1 page).

Patent Abstracts of Japan for Publ. No. 08190026 dated Jul. 23, 1996 (1 page).

Patent Abstracts of Japan for Publ. No. 62098305 dated May 7, 1987 (1 page).

\* cited by examiner

PRIOR ART

PRIOR ART

PRIOR ART

PRIOR ART

PRIOR ART

OPTICAL MULTIPLEXER/DEMULTIPLEXER, OPTICAL INTEGRATED CIRCUIT AND LIGHT TRANSCEIVER USING THE SAME

BACKGROUND OF THE INVENTION

1. Field of the Invention

The present invention relates to an optical multiplexer/demultiplexer, an optical integrated circuit and a light transceiver using the same.

2. Description of the Prior Art

FIG. 1 is a plan view showing the structure of a conventional optical multiplexer/demultiplexer. In this optical multiplexer/demultiplexer 1, a main core including a core 3 and a core 4 is formed on a tabular cladding layer 2. One end of the core 3 and one end of the core 4 are optically connected to each other through a slit 5 cut in the cladding layer 2. The ends of the main core are linear in shape, and the central portion of the main core is curved in the shape of S. The slit 5 is formed in the curved portion of the main core. Also, a core 6 branching from the core 3 at the position of the slit 5 is formed on the same side as the core 3. A thin-film filter 7 is inserted in the slit 5.

In this optical multiplexer/demultiplexer 1, as shown in FIG. 1, for example, assume that the light having the wavelength $\lambda 1$ (=1.31 μm) and the light having the wavelength $\lambda 2$ (=1.55 μm) enter and propagate through the core 3. Then, these light are demultiplexed. Specifically, the light having the wavelength $\lambda 1$ propagated through the core 3 and exits from the end surface thereof toward the thin-film filter 7 is transmitted through the thin-film filter 7. The light that has been transmitted through the thin-film filter 7 enters the core 4, and propagating through the core 4, exits from the end surface thereof. The light having the wavelength $\lambda 2$ that has exited toward the thin-film filter 7 from the end surface of the core 3, on the other hand, is reflected on the thin-film filter 7. The light that has been reflected on the thin-film filter 7 enters the core 6, and propagating through the core 6, exits from the end surface thereof. The light having the wavelength $\lambda 1$ which may be incident from the core 4, on the other hand, is transmitted through the thin-film filter 7, enters the core 3, and propagating through the core 3, exits from the end surface thereof.

In this optical multiplexer/demultiplexer 1, the light having the wavelength $\lambda 1$ incident from the core 4 and transmitted through the thin-film filter 7 may also propagate through the core 6 by circumvention. The light of the wavelength $\lambda 1$ that has circumvented into the core 6 constitutes a noise in the core 6 or causes a signal loss in the core 3, thereby posing the problem of a communication interference.

To suppress the circumvention of the light described above, a method is generally known as effective in which as shown in FIG. 2, the angle θ (hereinafter referred to as the branching angle) at which the cores 3 and 6 branch from each other is increased to increase the isolation between the cores 3 and 6. With the increase in the branching angle θ, however, the incidence angle (=θ/2) of the light entering the thin-film filter 7 also increases, and therefore the difference of the cut band between the P wave and the S wave is also increased due to the characteristics of the thin-film filter 7. In the case where the filter demultiplexing characteristic (transmission loss) of the low-pass thin-film filter 7 is shown separately for the P polarized light and the S polarized light, for example, as shown in FIG. 3, the area where the transmission loss undergoes a sudden change is different for the P polarized light and the S polarized light (polarization dependency). This deviation is expressed as the P-S wavelength difference $\Delta\lambda$ in terms of wavelength. FIG. 4, in which the abscissa represents the branching angle θ between the cores 3 and 6 and the ordinate the P-S wavelength difference $\Delta\lambda$, shows the relation between the branching angle θ and the P-S wavelength difference $\Delta\lambda$. As shown in FIG. 4, the larger the branching angle θ, the larger the P-S wavelength difference $\Delta\lambda$.

As described above, with the increase in the difference of the cut band between the P and S waves, part of the S polarized light of the wavelength $\lambda 1$ is reflected on the thin-film filter 7, or part of the P polarized light of the wavelength $\lambda 2$ is transmitted through the thin-film filter 7, thereby separating the light rays. As a result, the optical signal is changed and the reproducibility is reduced. To prevent this situation, the upper limit value of the branching angle θ is required to be set by the P-S wavelength difference $\Delta\lambda$. Specifically, as shown in FIG. 3, let the wavelength band of the light having the wavelength $\lambda 1$ of 1.31 μm be 1.26 to 1.36 μm, and the wavelength band of the light having the wavelength $\lambda 2$ of 1.55 μm is 1.48 to 1.58 μm. Then, the distance between the two wavelength bands is given as 0.12 μm (=1.48−1.36). To prevent the P and S waves from being separated from each other, therefore, the P-S wavelength difference $\Delta\lambda$ is required to be 120 nm or less. As seen from FIG. 4, the branching angle θ corresponding to the P-S wavelength difference $\Delta\lambda$ of 120 nm is about 80 degrees, and therefore the branching angle θ is required to be about 80 degrees or less. Taking variations into consideration, however, the suitable branching angle θ is considered about 60 degrees or less. In the optical multiplexer/demultiplexers in general, the branching angle θ is desirably set to a maximum value not larger than about 60 degrees. Especially, the branching angle θ of about 60 degrees is considered appropriate to achieve a high isolation without increasing the polarization dependency.

In the optical multiplexer/demultiplexer 1 having the conventional structure, however, an increased branching angle θ to increase the light isolation makes it necessary to curve the considerably tilted core in the direction parallel to the length of the optical multiplexer/demultiplexer 1 resulting in an increased length along the curved portion of the core. A larger radius of curvature of the core, on the contrary, could shorten the length along the core. An excessively increased radius of curvature of the core, however, would increase the light leakage from the core. An attempt to suppress the light leakage, therefore, would increase the length along the curved portion of the core for an increased length and an increased width of the optical multiplexer/demultiplexer 1, thereby leading to a greater size of the optical multiplexer/demultiplexer 1. FIG. 5 is a diagram showing the relation between the branching angle θ between the cores 3 and 6 and the waveguide size (area) of the optical multiplexer/demultiplexer 1. As apparent from FIG. 5, the increase of the branching angle θ to about 60 degrees considered as the optimal value exponentially increases the waveguide size of the optical multiplexer/demultiplexer 1. In the conventional optical multiplexer/demultiplexer 1, therefore, a high isolation and a smaller size of the waveguide cannot be attained at the same time, and it is impossible to produce a small optical multiplexer/demultiplexer having a high isolation characteristic. Also, an increased waveguide size to secure a high isolation increases the signal loss due to the material loss of the core.

SUMMARY OF THE INVENTION

This invention has been achieved in view of the technical problems described above, and the object thereof is to provide an optical multiplexer/demultiplexer, an optical integrated circuit and a light transceiver using the same, which are high in isolation characteristic, small in polarization dependency and can be reduced in size.

According to a first aspect of the invention, there is provided an optical multiplexer/demultiplexer comprising an optical waveguide formed with at least a first core and a second core therein, wherein one end surface of the first core is in opposed relation to a filter, the second core is arranged on the same side of the filter as the first core and optically coupled to the first core through the filter, and at least a part of the first core is curved in a form protruded toward the second core.

According to a second aspect of the invention, there is provided an optical multiplexer/demultiplexer comprising an optical waveguide formed with a first core, a second core and a third core therein, wherein an end surface of the first core and an end surface of the third core are arranged in opposed relation in such a manner as to be optically coupled to each other through a filter, the second core is arranged on the same side of the filter as the first core in such a manner as to be optically coupled to the first core through the filter, the first core and the third core each have a curved portion, the curved portion of the first core is formed in such a manner as to be protruded toward the second core, and the end portion of each of the first and the third cores far from the filter reaches an end surface of the optical waveguide, while the end portion of the second core far from the filter reaches a side surface different from the end surface of the optical waveguide.

According to a third aspect of the invention, there is provided an optical multiplexer/demultiplexer comprising an optical waveguide formed with at least a first core and a second core therein, wherein one end surface of the first core is in opposed relation to a filter, the second core is arranged on the same side of the filter as the first core in such a manner as to be optically coupled to the first core through the filter, and the optical axis at the end portion of the first core far from the filter is not parallel to the end side of the optical waveguide where the end surface of the first core is not located.

According to a fourth aspect of the invention, there is provided an optical multiplexer/demultiplexer comprising an optical waveguide formed with a first core, a second core and a third core therein, wherein an end surface of the first core and an end surface of the third core are arranged in opposed relation in such a manner as to be optically coupled to each other through a filter, the second core is arranged on the same side of the filter as the first core in such a manner as to be optically coupled to the first core through the filter, and the optical axis at the end portion of the first core far from the filter is not parallel to the end side of the optical waveguide where the end surface of the first core is not located.

DESCRIPTION OF THE PREFERRED EMBODIMENTS

Embodiments of the invention are described below in detail with reference to the drawings. Nevertheless, this invention is of course not limited to these embodiments.

First Embodiment

Figure 6:
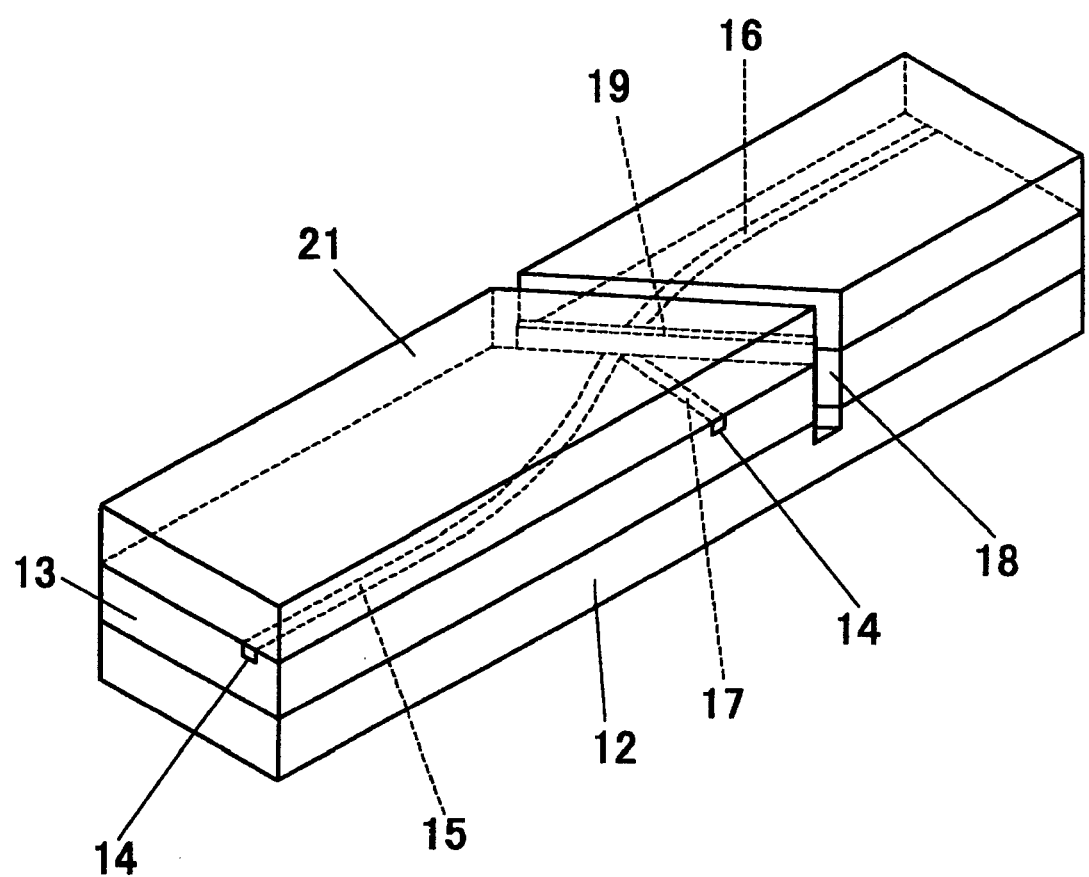
FIG. 6 shows a perspective view of the optical multiplexer/demultiplexer according to a first embodiment of the invention.
Figure 7:
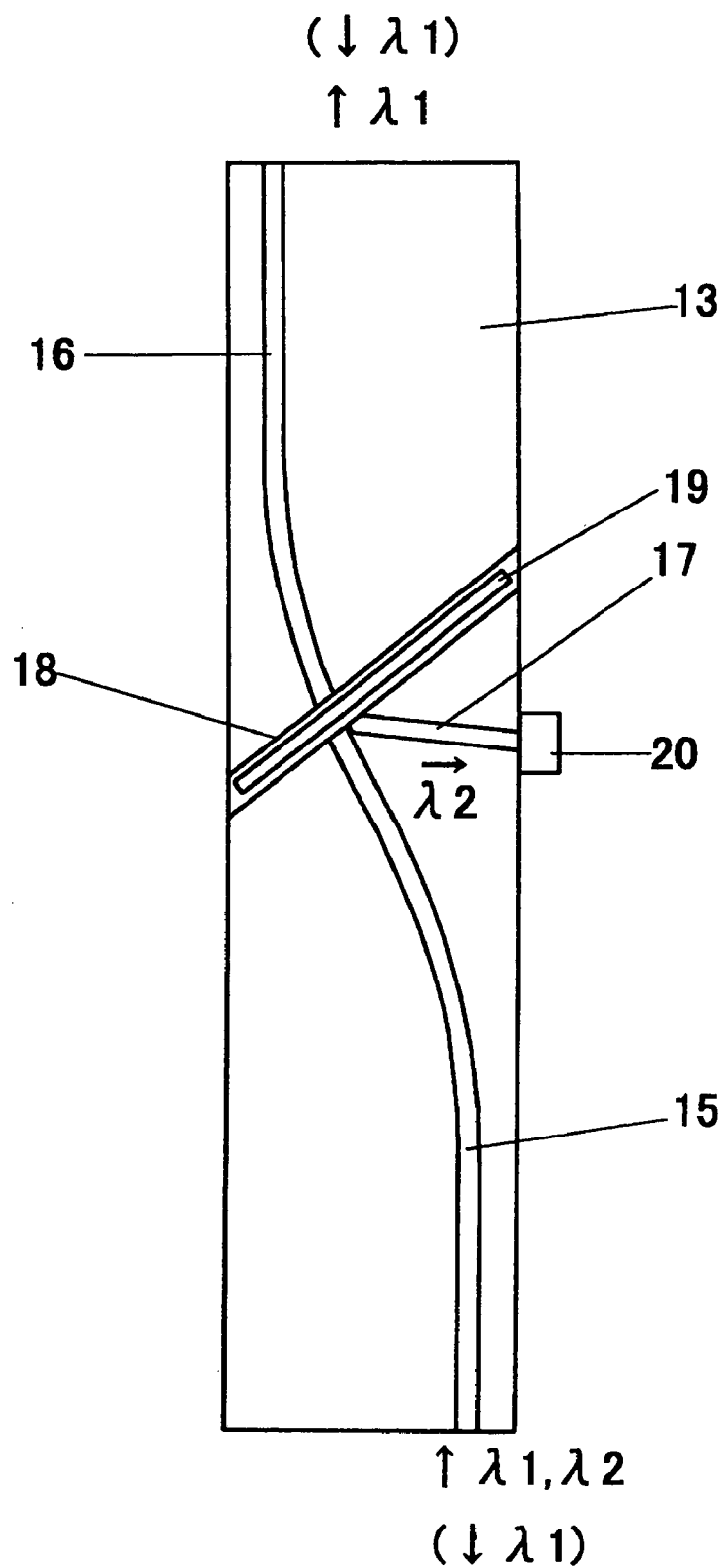
FIG. 7 shows a plan view of the same optical multiplexer/demultiplexer.

FIG. 6 is a perspective view showing an optical multiplexer/demultiplexer (optical waveguide) 11 according to a first embodiment of the invention. FIG. 7 is a plan view of the optical multiplexer/demultiplexer 11 shown without an upper cladding layer 21. In this optical multiplexer/demultiplexer 11, a lower cladding layer 13 in tabular form is formed on a substrate 12. Three cores 15, 16, 17 are formed in a core groove 14 formed in the surface of the lower cladding layer 13. The core 15 (first core) and the core 16 (third core) make up a curved main core. The ends of the main core (the end portions of the cores 15, 16 far from a thin-film filter 19 described later) reach the two end surfaces of the lower cladding layer 13. At the end portions of the lower cladding layer 13, the end portions of the cores 15, 16 are linearly formed and extend in parallel to the length of the lower cladding layer 13. The central portion of the main core is curved in the shape of S. A slit 18 is cut in by laser or dicing from the upper surface of the upper cladding layer 21 to the substrate 12. The main core is separated at the curved portion thereof into the cores 15 and 16 by the slit 18. A thin-film filter 19 formed of a dielectric multilayer film is inserted in the slit 18. The end surface of the core 15 and the end surface of the core 16 are exposed in the slit 18, and placed in opposed relation to each other in such a manner as to be optically coupled with each other through the thin-film filter 19. This thin-film filter 19 has such a characteristic that the light in the wavelength range of $\lambda 1$ (=1.31 μm) is transmitted therethrough, while the light in the wavelength range of $\lambda 2$ (=1.55 μm) is reflected thereon.

The upper cladding layer 21 and the lower cladding layer 13 are formed of glass or translucent resin. The cores 15, 16, 17 are formed also of glass or translucent resin having a larger refractive index than the upper and lower cladding layers 21, 13. Especially, a resin waveguide including the upper and lower cladding layers 21, 13 and the cores 15, 16, 17 formed of resin can be mass produced by duplication, and therefore a low-cost optical multiplexer/demultiplexer can be obtained.

Figure 8:
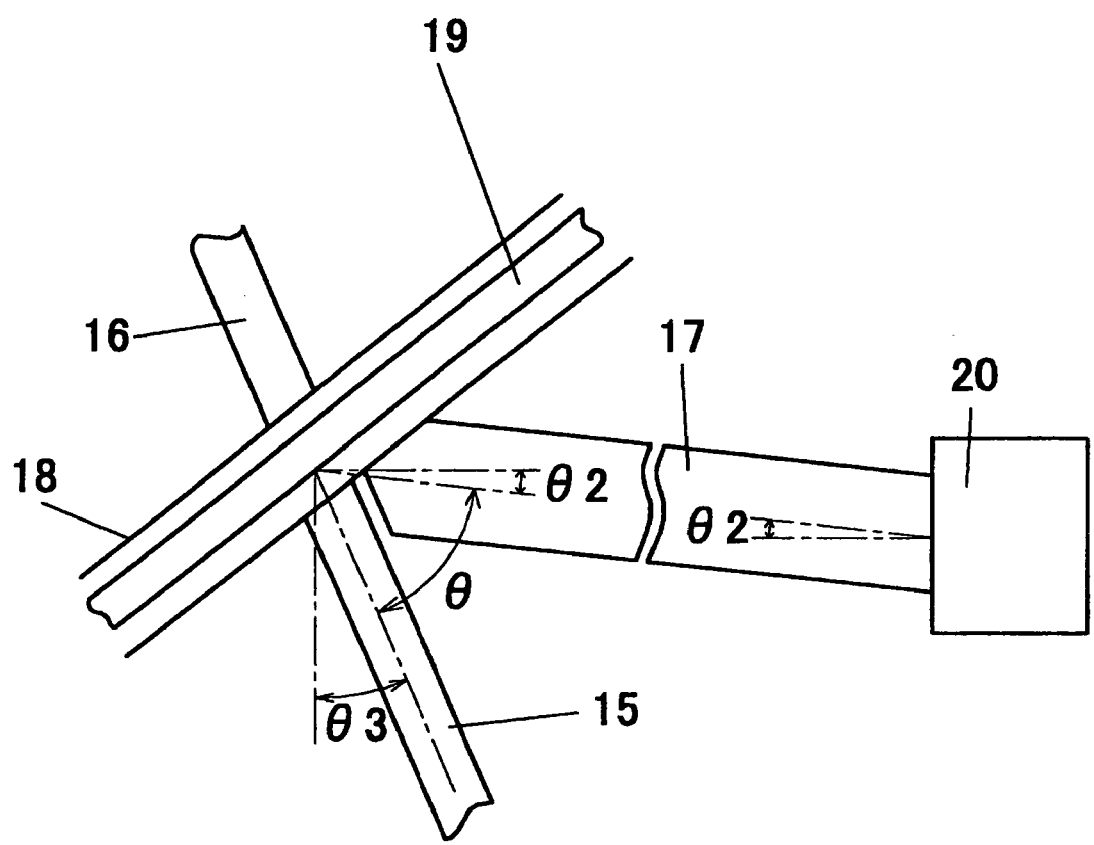
FIG. 8 shows a diagram for explaining the operation of the optical multiplexer/demultiplexer according to the first embodiment of the invention.

FIG. 8 is a diagram schematically showing the filter portion in enlarged form. The core 17 (second core) is extended linearly and arranged on the same side of the slit 18 as the core 15. The core 17 is arranged on the protruded side of the curved portion of the core 15. As shown in FIG. 8, the inner end surface of the core 17 is adjacent to the side surface of the core 15 with an intermediate gap of 3 to 15 μm therebetween. The end portion of the core 15 and the end portion of the core 17 are optically coupled to each other through the thin-film filter 19. A part of the core 17 is exposed in the slit 18. The outer end portion of the core 17 reaches the side surface of the lower cladding layer 13.

In this optical multiplexer/demultiplexer 11, an optical fiber is connected to the end surfaces of the cores 15, 16. In FIG. 7, a light-receiving element 20 such as a photodiode is arranged in opposed relation to the end surface of the core 17. Nevertheless, an optical fiber may be connected to the end surface of the core 17.

In this optical multiplexer/demultiplexer 11, as shown in FIG. 7, for example, the light having the wavelength $\lambda 1$ of 1.31 μm and the light having the wavelength $\lambda 2$ of 1.55 μm are rendered to enter and propagate through the core 15. Then, the light having the wavelength $\lambda 1$ that has proceeded from the end surface of the core 15 toward the thin-film filter 19 enters the core 16 through the thin-film filter 19, and propagating through the core 16, exits from the end surface of the core 16 and comes to be coupled to the optical fiber. The light having the wavelength $\lambda 2$ that has proceeded through and exited from the end surface of the core 15 toward the thin-film filter 19, on the other hand, is reflected on the thin-film filter 19 and enters the core 17. This light propagates through the core 17, exits from the end surface of the core 17 and is received by the light-receiving element 20. In other words, the demultiplexing operation is performed. The light having the wavelength $\lambda 1$ that has entered the core 16, on the other hand, enters the core 15 through the thin-film filter 19, and propagating through the core 15, exits from the end surface of the core 15. Though not explained in detail, the multiplexing operation instead of the demultiplexing operation may be performed.

The end portion of the core 15 and the end portion of the core 17 are not structurally connected to each other but arranged adjacently to each other with an appropriate length (say, 10 μm) of an intermediate gap. Thus, part of the light exiting from the core 16 and entering the core 15 through the thin-film filter 19, therefore, is liable to circumvent and prevented from propagating through the core 17 not easily. Nevertheless, the cores 15 and 17 may of course be connected to each other.

The core 15 has such a width that the light having the wavelength $\lambda 1$, $\lambda 2$ propagate therethrough in single mode. The core 16 has such a width that the light having the wavelength $\lambda 1$ propagates therethrough in single mode. The core 17 has such a width that the light having the wavelength $\lambda 2$ propagates therethrough in multiple mode. Thus, the width of the core 17 is larger than that of the cores 15, 16. This is by reason of the fact that the signal delay due to the propagation mode can be ignored for the core 17 having a short length. In the single-mode core which has as small a width as about 6 μm, the displacement, if any, of the thin-film filter 19 would considerably reduce the coupling efficiency between the core and the light (demultiplexed light) reflected on the thin-film filter 19. In the multimode core having a width as large as not less than 10 μm (say, 10 to 60 μm), however, a slight displacement of the thin-film filter 19 still keeps a stable coupling efficiency between the core and the demultiplexed light reflected on the thin-film filter 19. In the case where the slit 18 is cut in the upper cladding layer 21 and the lower cladding layer 13, therefore, the tolerance of displacement and positional variations of the slit 18 is increased, which in turn facilitates the fabrication of the optical multiplexer/demultiplexer 11, thereby realizing a low-cost optical multiplexer/demultiplexer 11 with an improved performance. As long as the machining accuracy of the slit 18 is high, the width of the core 17 may of course be such that the light is propagated through the core 17 in single mode.

The multimode core 17 having a width of not less than 10 µm can relax the positional accuracy of the slit 18 and therefore facilitates the fabrication. More desirably, the core 17 has a width of about 60 µm or less which permits the use of the multimode glass fiber with a smaller connection loss available on the market. In the case where the refractive index difference of more than 1% cannot be secured between the lower cladding layer 13 and the core 17, on the other hand, a large loss would occur at the curved portion of the multimode core 17. By forming the core 17 linearly as in this embodiment, however, the loss due to the curved portion can be done without.

The multimode core 17 may have either the same width as the height thereof or a width different from the height. Also, the same height of the multimode core 17 as the single-mode cores 15, 16 facilitates the production of the cores 15, 16, 17.

FIG. 8 is a diagram showing relative positions of the cores 15, 16, 17 in the neighborhood of the thin-film filter 19. The optical axis at the end portion of the core 15 forms an angle of θ3 (called the deflection angle) to the length of the optical multiplexer/demultiplexer 11 and an angle of θ (branching angle) to the core 17. The core 17 is tilted at an angle of θ2 (called the tilt angle of the core 17) with respect to the width of the optical multiplexer/demultiplexer 11. These angles have the relation θ3+θ+θ2=90 degrees. Also, the optical axis at the end portion of the core 15 and the optical axis of the core 17 are required to form substantially the same angle to the normal to the thin-film filter 19. Since the multimode core 17 has a larger width, however, the light incident from the direction at an angle to the length of the core 17 can also be received and propagated in the core 17. The direction in which the core 17 is arranged, therefore, is allowed to deviate considerably from the direction symmetric with respect to the core 15 about the normal to the thin-film filter 19.

Figure 9:
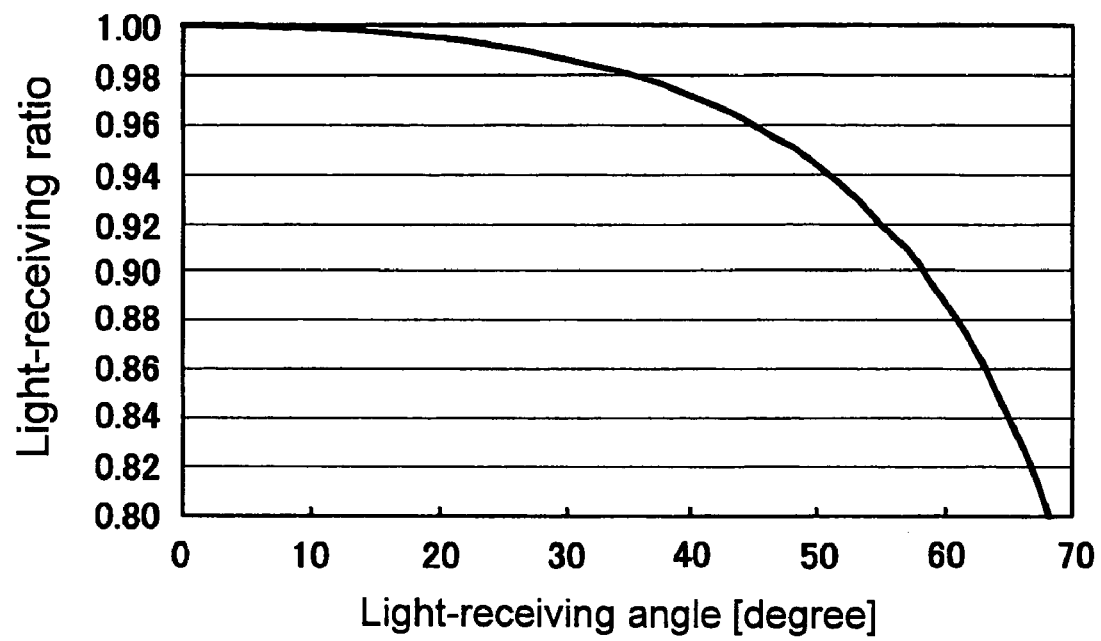
FIG. 9 shows the relation between the light-receiving angle and the light-receiving ratio of a light-receiving element.

The multimode core 17 is tilted at an angle θ2 to the normal to the side surface of the optical multiplexer/demultiplexer 11 as described above. Nevertheless, the multimode core 17 may alternatively be arranged in a position perpendicular to the side surface of the optical multiplexer/demultiplexer 11. In the case where the core 17 is tilted with respect to the side surface of the optical multiplexer/demultiplexer 11 (θ2=0), however, the light output from the core 17 is received by the light-receiving element 20 from a diagonal direction, and therefore the light-receiving efficiency of the light-receiving element 20 may be reduced. FIG. 9 shows the relation between the light-receiving angle (θ2) and the percentage of the received light amount of the light-receiving element 20 on the assumption that the amount of light incident to and received by the light-receiving element 20 in the direction perpendicular thereto is unity. This is obtained by calculating the reflection on the light-receiving surface of the light-receiving element 20 using the Fresnel's formulas and the Snell's law. It is understood from FIG. 6 that the light-receiving element 20 receives a sufficient amount of light (98%) even in the case where the light-receiving angle (θ2) is about 35 degrees. Thus, the tilt angle θ2 of the core 17 is sufficiently 35 degrees or less.

Considering the light-receiving efficiency of the light-receiving element 20, the tilt angle θ2 of the core 17 is preferably 35 degrees or less, or more preferably equal to zero. The branching angle θ between the cores 15 and 17 being constant, however, an increased tilt angle θ2 of the core 17 can decrease the deflection angle θ3 (=90 degrees− θ−θ2) of the core 15. Thus, the length along the curved portion of the core 15 can be shortened, so that the waveguide size of the optical multiplexer/demultiplexer 11 can be reduced. As a result, the tilt angle θ2 of the core 17 is desirably determined in the range not more than 35 degrees taking the waveguide size into consideration.

Now, let us consider the branching angle θ. As explained with reference to the prior art, taking the polarization dependency and the inter-core isolation into consideration, the branching angle θ desirably assumes a value as large as possible but not more than 60 degrees.

Figure 1:
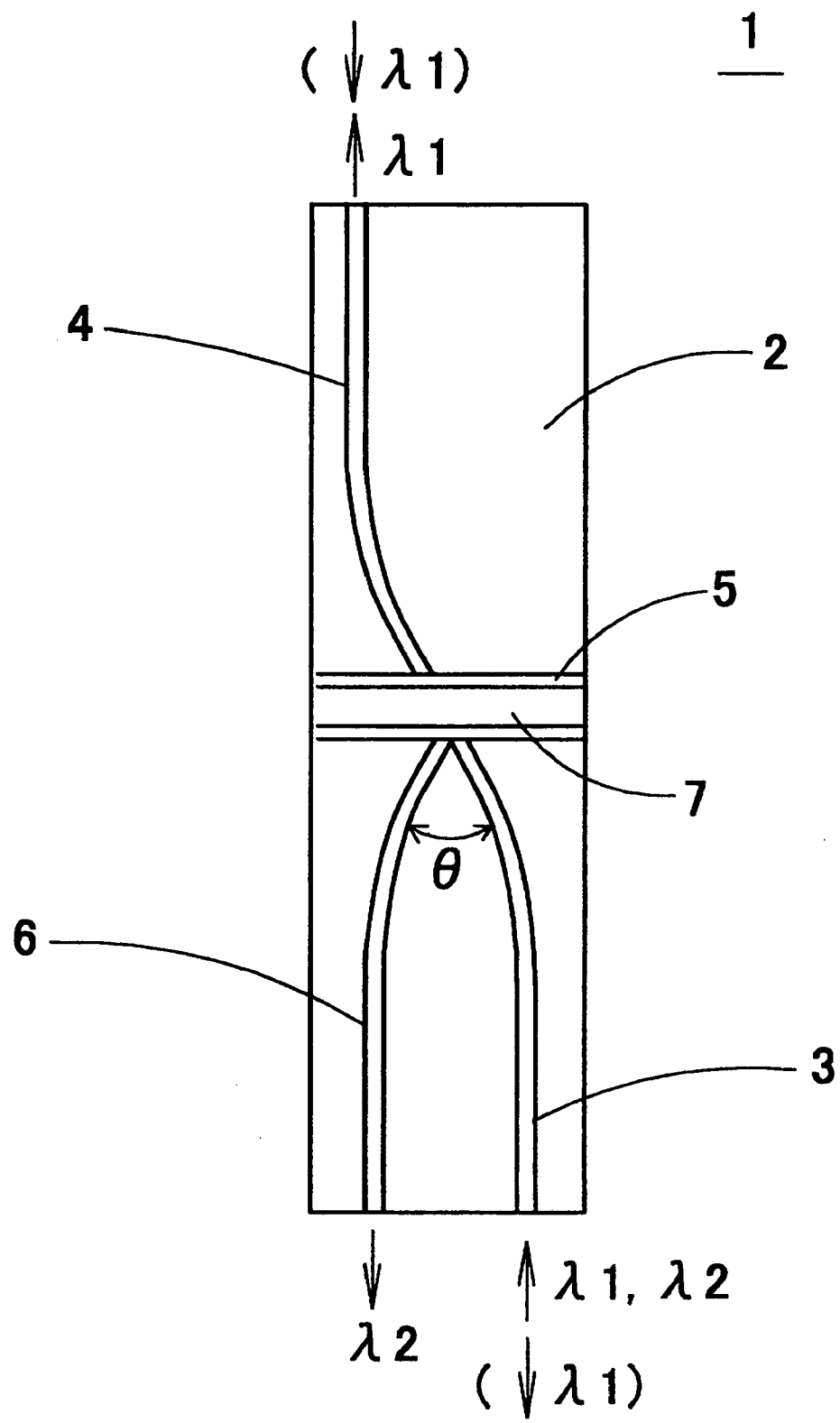
FIG. 1 shows a plan view of the structure of the conventional optical multiplexer/demultiplexer.
Figure 2:
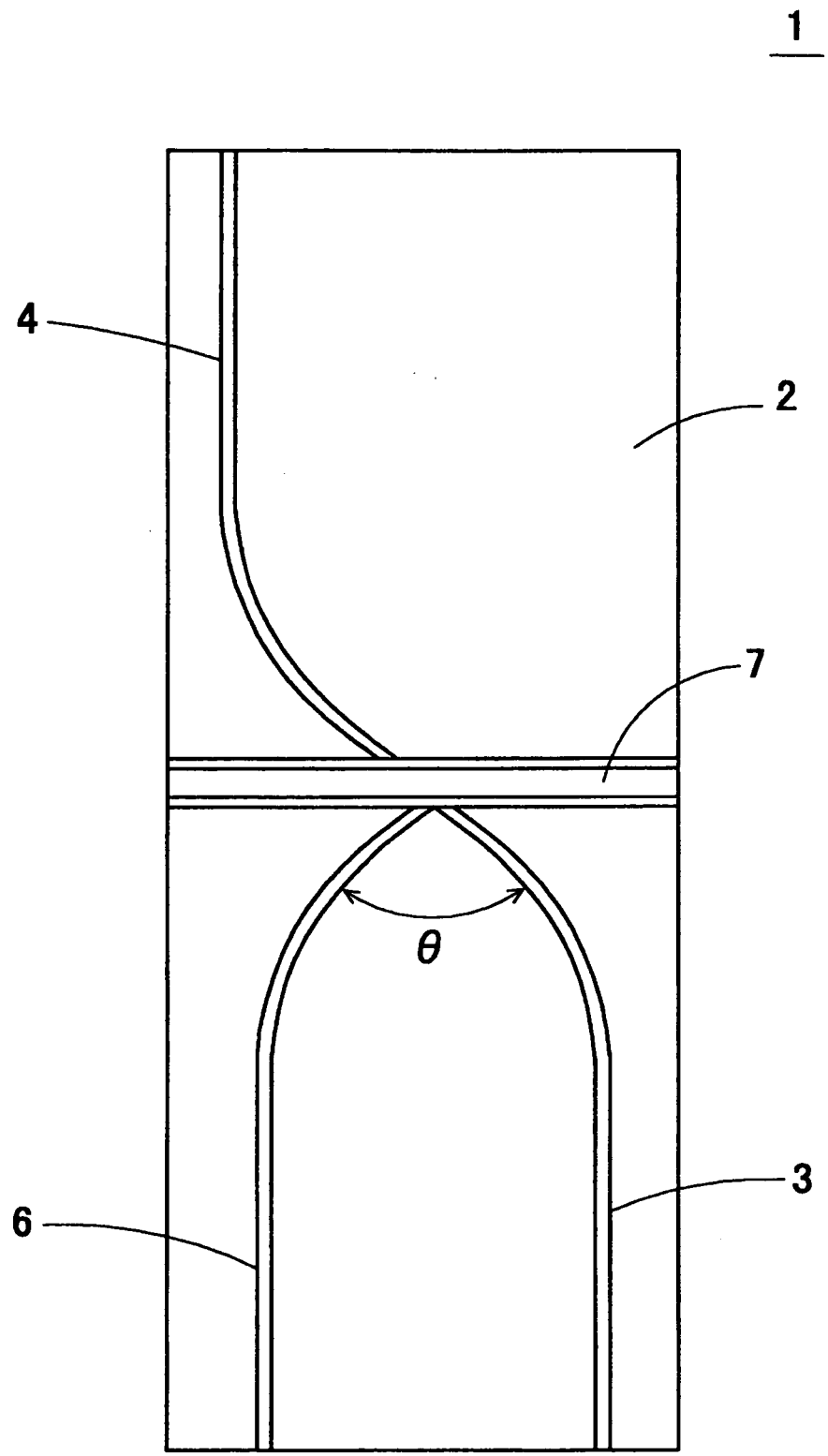
FIG. 2 shows a plan view illustrating the manner in which the branching angle is increased in the same optical multiplexer/demultiplexer.
Figure 3:
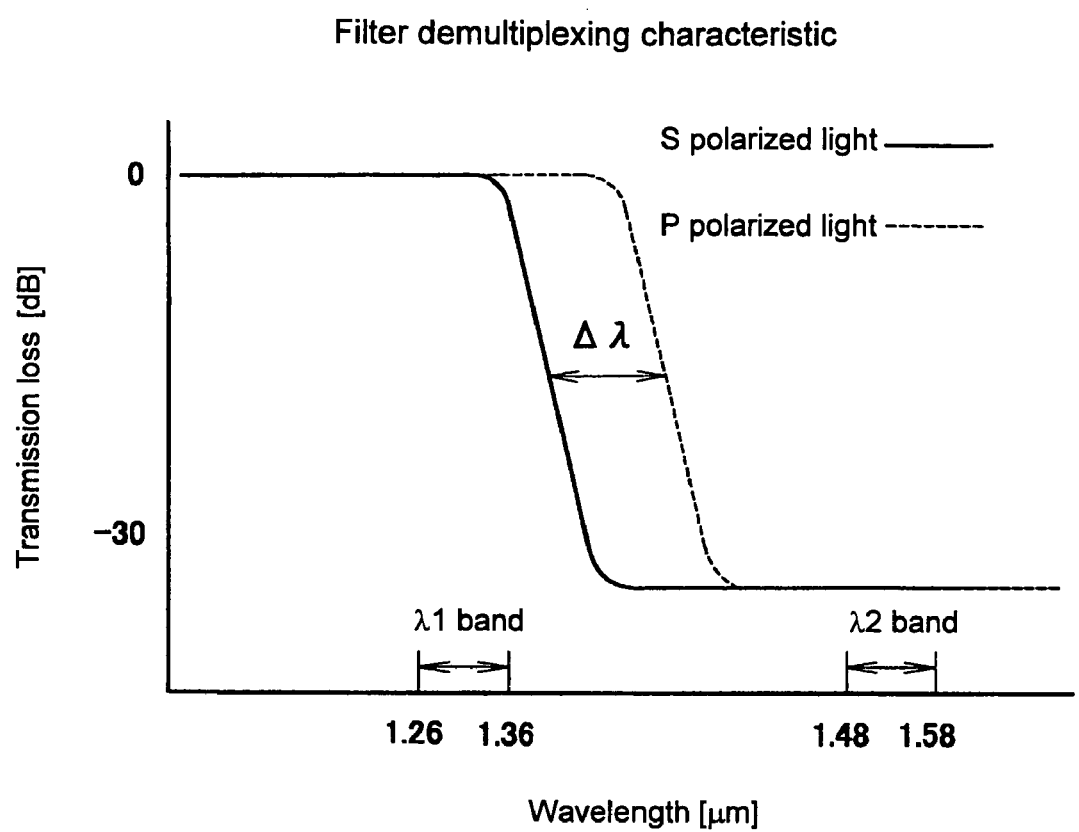
FIG. 3 shows a diagram for explaining the deviation (P-S wavelength difference $\Delta\lambda$) of the cut band between the P polarized light and the S polarized light.
Figure 4:
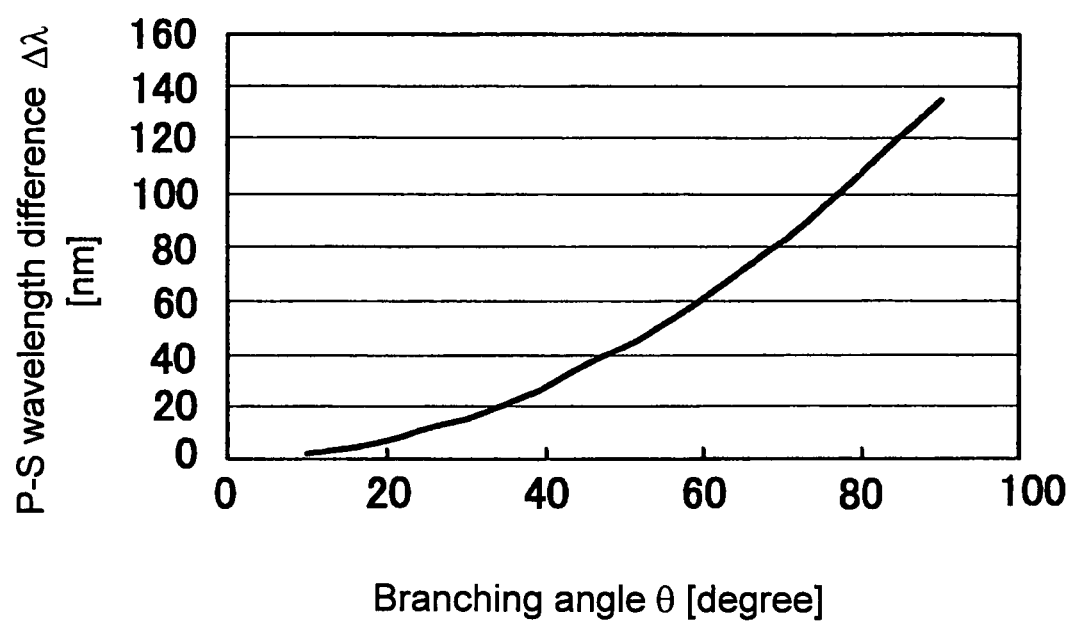
FIG. 4 shows the relation between the inter-core branching angle $\theta$ and the P-S wavelength difference $\Delta\lambda$.
Figure 5:
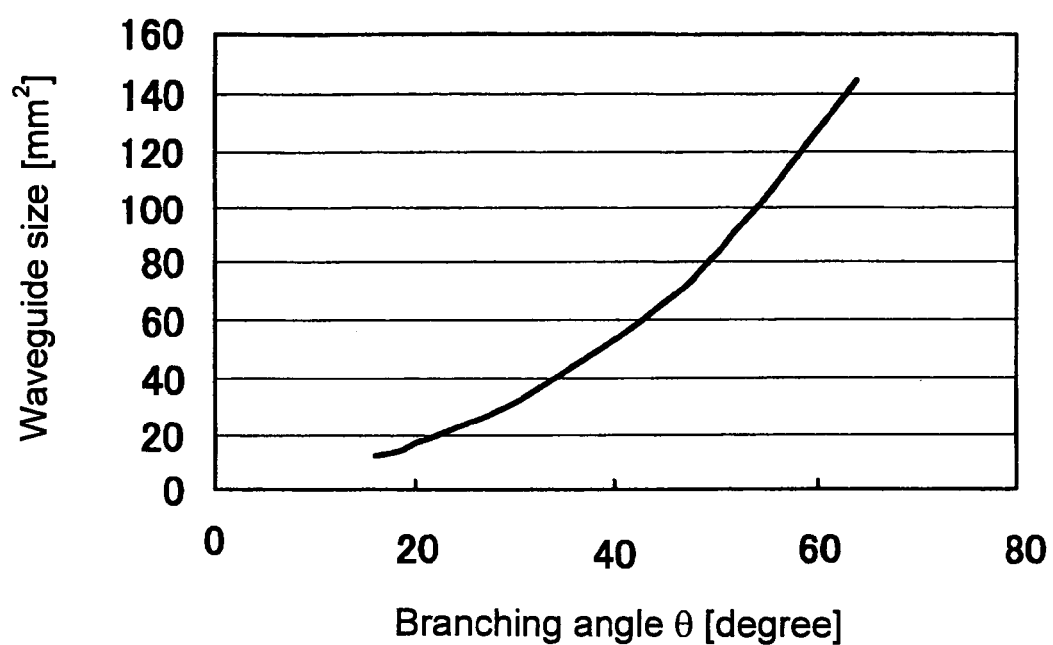
FIG. 5 shows the relation between the inter-core branching angle $\theta$ and the waveguide size (area) of the optical multiplexer/demultiplexer.
Figure 10:
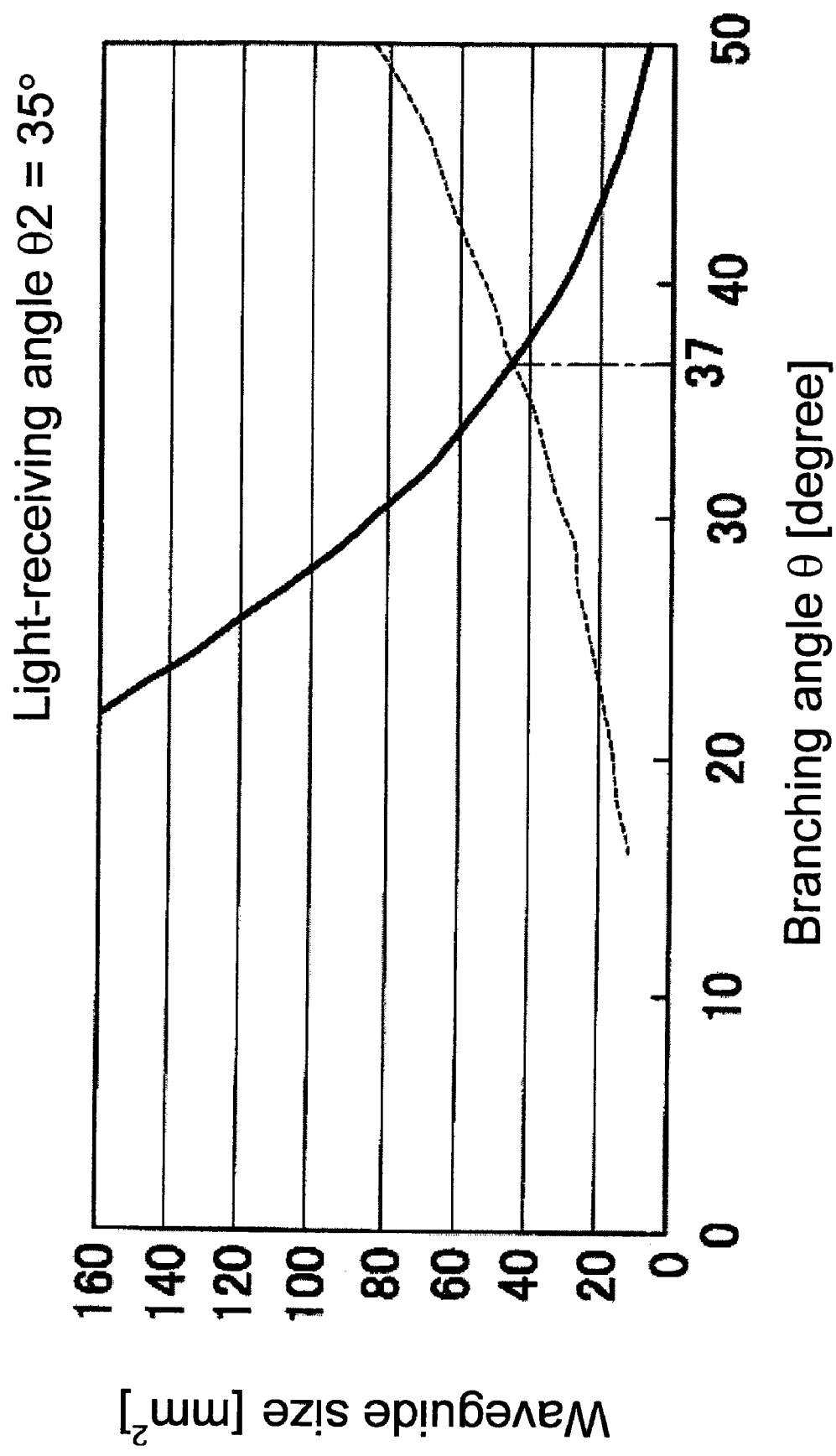
FIG. 10 shows the relation between the inter-core branching angle $\theta$ and the waveguide size for the multimode core angle $\theta 2$ of 35 degrees.

FIG. 10 is a diagram showing the relation between the branching angle θ and the waveguide size. In FIG. 10, the solid line represents the branching angle θ between the cores 15 and 17 as related to the waveguide size with the tilt angle θ2 (the light-receiving angle of the light-receiving element 20) of the core 17 set to 35 degrees. Also, the dashed line represents the relation between the branching angle θ and the waveguide size of the conventional structure. As understood from FIG. 10, with the conventional structure, an increased branching angle θ increases the waveguide size. This is by reason of the fact that an increased branching angle θ increases the length along the curved portion of the core (See FIG. 2). According to this invention, on the other hand, an increased branching angle θ decreases the waveguide size. This is by reason of the fact that an increased branching angle θ between the cores 15 and 17 decreases the deflection angle θ3 of the core 15 and correspondingly decreases the required length along the curved portion of the core 15. In the case where θ2 is 35 degrees, therefore, the waveguide size can be considerably reduced than in the prior art by increasing the branching angle θ to 37 degrees or more. This difference is conspicuous at the optimum value of about 60 degrees of the branching angle θ. Also, as seen from FIG. 5, according to the prior art, the waveguide size is 140 mm$^2$ or more for the branching angle θ of 60 degrees. In the optical multiplexer/demultiplexer 11 according to the invention, however, as seen from FIG. 10, the waveguide size is about 80 mm$^2$ for the branching angle θ of 30 degrees, and therefore, the waveguide size for the branching angle θ of 30 degrees can be reduced as compared with the waveguide size of the conventional structure for the branching angle θ of 60 degrees.

Figure 11:
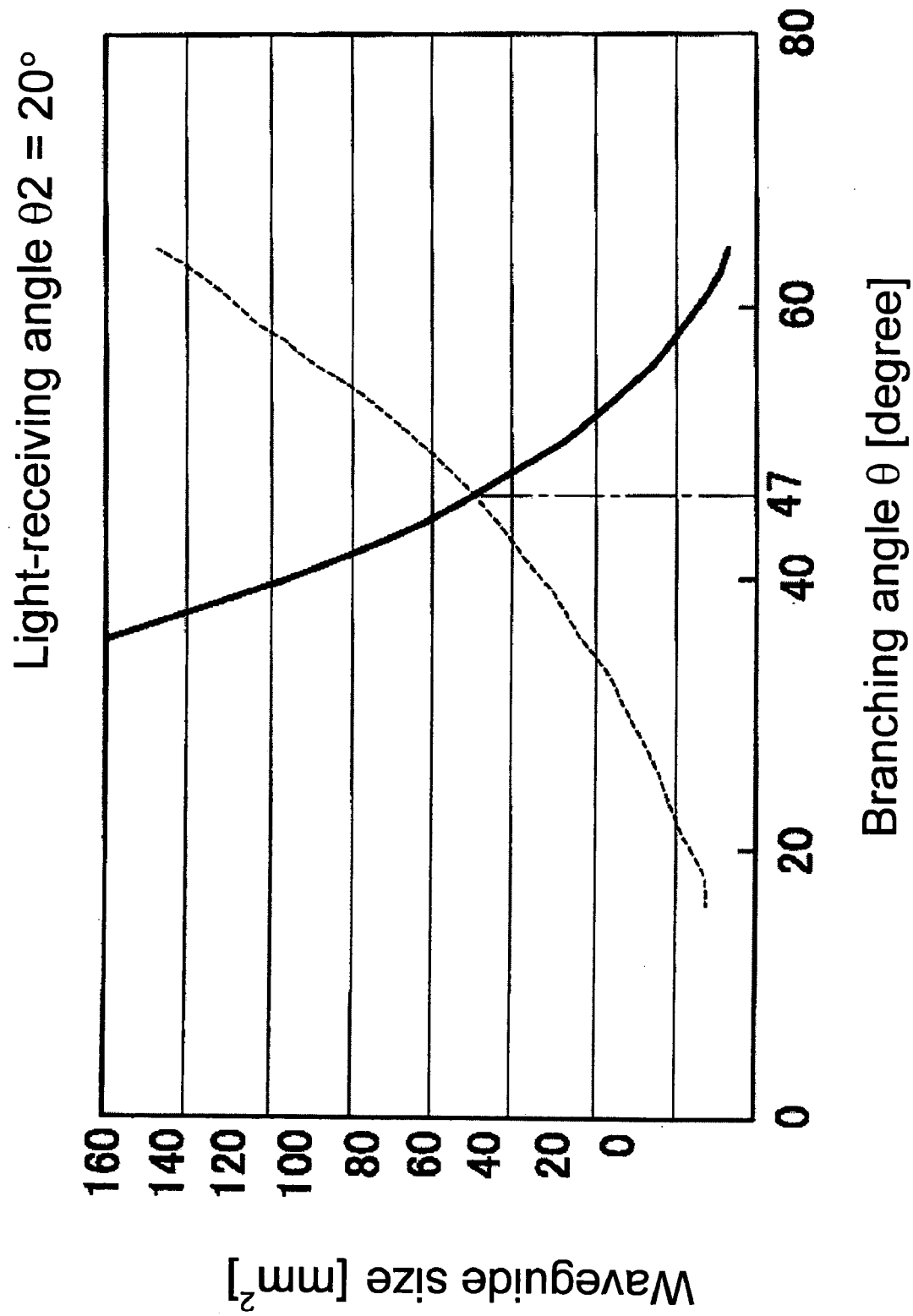
FIG. 11 shows the relation between the inter-core branching angle $\theta$ and the waveguide size for the multimode core angle $\theta 2$ of 20 degrees.

Similarly, in FIG. 11, the solid line shows the relation between the branching angle θ and the waveguide size according to the invention, while the dashed line represents the relation between the branching angle θ and the waveguide size in the conventional structure in the case where the tilt angle θ2 of the core 17 (the light-receiving angle of the light-receiving element) is set to 20 degrees. This indicates that as long as θ2 remains at 20 degrees, the waveguide size can be reduced than in the prior art by increasing the branching angle θ to more than 47 degrees.

As described above, with the structure according to the invention, a high isolation characteristic of the optical multiplexer/demultiplexer 11 can be achieved while at the same time reducing the waveguide size of the optical multiplexer/demultiplexer 11 by increasing the branching angle θ as much as possible without excessively increasing the polarization dependency (i.e. beyond the branching angle θ of, say, 60 degrees). In this way, an optical multiplexer/demultiplexer 11 having both a high isolation characteristic and a small size can be realized.

Also, according to the invention, the length of the core 17 can be decreased by leading the core 17 linearly to the side surface of the optical multiplexer/demultiplexer 11. Therefore, the loss can be reduced in the case where the core 17 is fabricated of a material such as resin having a large material loss. Also, a smaller size of the optical multiplexer/demultiplexer 11 shortens the length along the curved portion of the core 15. In similar fashion, therefore, the loss can be reduced in the case where the core 15 is formed of a material such as resin having a large material loss.

By reducing the deflection angle θ3 of the core 15 below one half of the branching angle θ (i.e. θ3<θ/2), the waveguide size can be reduced while at the same time making it possible to increase the optical isolation characteristic of the optical multiplexer/demultiplexer 11.

The foregoing study shows that the light isolation characteristic is improved while at the same time reducing the waveguide size by setting the deflection angle θ3 of the core 15 to about 40 degrees or less and the branching angle θ to about 37 to 80 degrees. The upper limit of the branching angle θ is set to 80 degrees because the theoretical upper limit can be approached by reducing the variations. Also, by setting the deflection angle θ3 to 8 to 12 degrees and the branching angle θ to 40 to 70 degrees, both the isolation characteristic can be improved and the chip size can be reduced even more at the same time. The tilt angle θ2 of the core 17 is desirably set to 0 to about 35 degrees. According to this embodiment, the deflection angle θ3 is set to 10 degrees, the branching angle θ to 60 degrees, and the tilt angle θ2 of the core 17 to 20 degrees.

In forming the optical multiplexer/demultiplexer 11, the thickness of the upper cladding layer 21 and the lower cladding layer 13 is reduced each to about 5 to 50 μm and no substrate is mounted on the upper cladding layer 21. In this way, the slit 18 can be cut easily. Incidentally, the upper cladding layer 21 may be done without.

Figure 12:
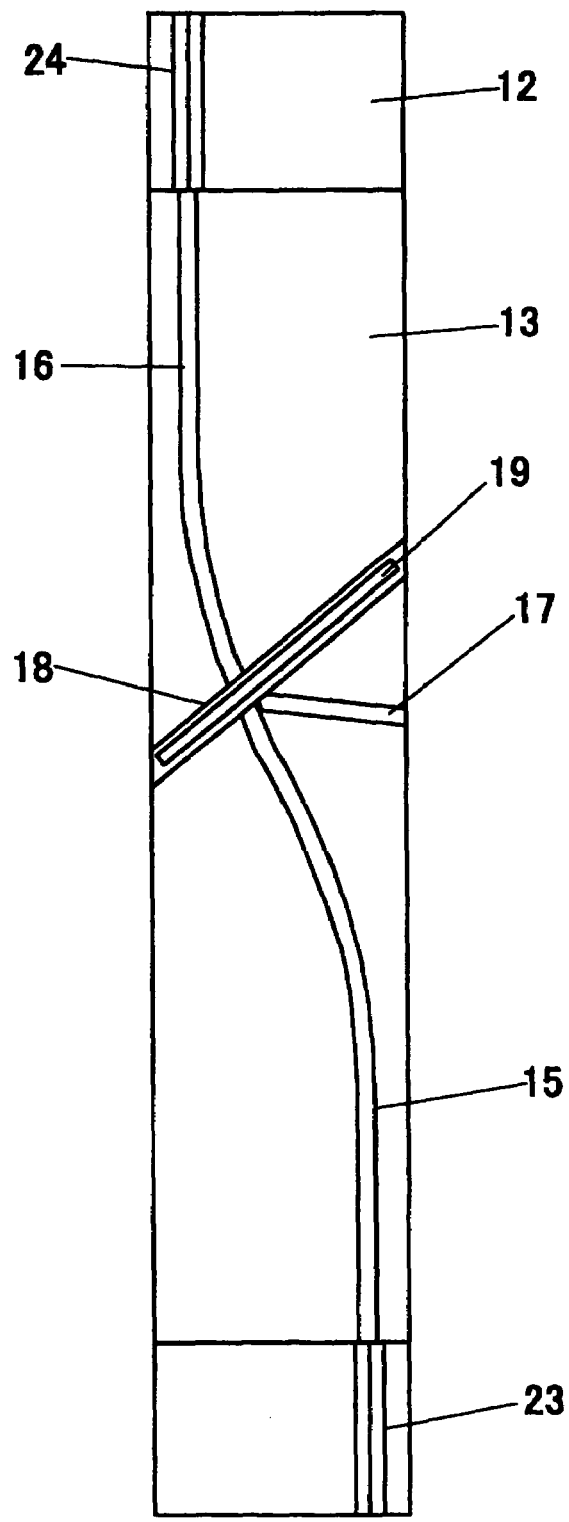
FIG. 12 shows a different form of the optical multiplexer/demultiplexer.

In connecting the optical fiber to the cores 15, 16, as in the optical multiplexer/demultiplexer 22 shown in FIG. 12, the substrate 12 may be formed with V-shaped alignment grooves 23, 24 at the portion where the cores 15, 16 and the optical fiber are connected. The V-shaped alignment grooves 23, 24 make it possible to match the optical axis of the optical fiber with the cores 15, 16 by fitting the optical fiber therein. In this case, the use of the substrate 12 of Si or the like permits the V-shaped alignment grooves 23, 24 to be easily formed by anisotropic etching.

Second Embodiment

Figure 13:
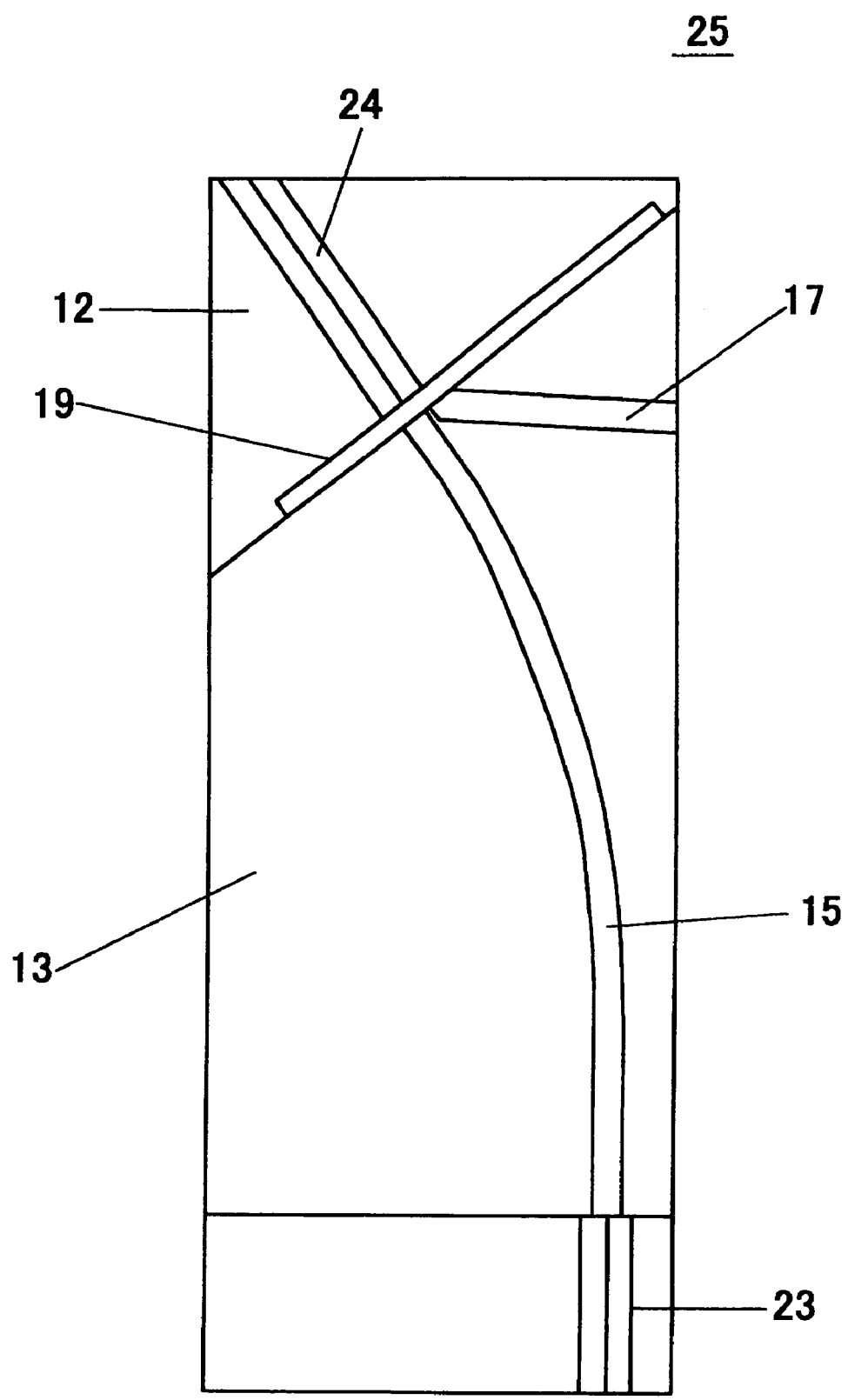
FIG. 13 shows a plan view of a light transceiver according to a second embodiment of the invention.

FIG. 13 is a plan view showing an optical multiplexer/demultiplexer 25 according to a second embodiment of the invention. The upper cladding layer 21 is not shown in this drawing and other subsequent drawings. In this optical multiplexer/demultiplexer 25, the core 16 in the first embodiment is not included, and a thin-film filter 19 is attached to the end surface of the lower cladding layer 13. The light having the wavelength λ1 demultiplexed by the thin-film filter 19 is adapted to directly enter the optical fiber fitted in the alignment groove 24.

Third Embodiment

Figure 14:
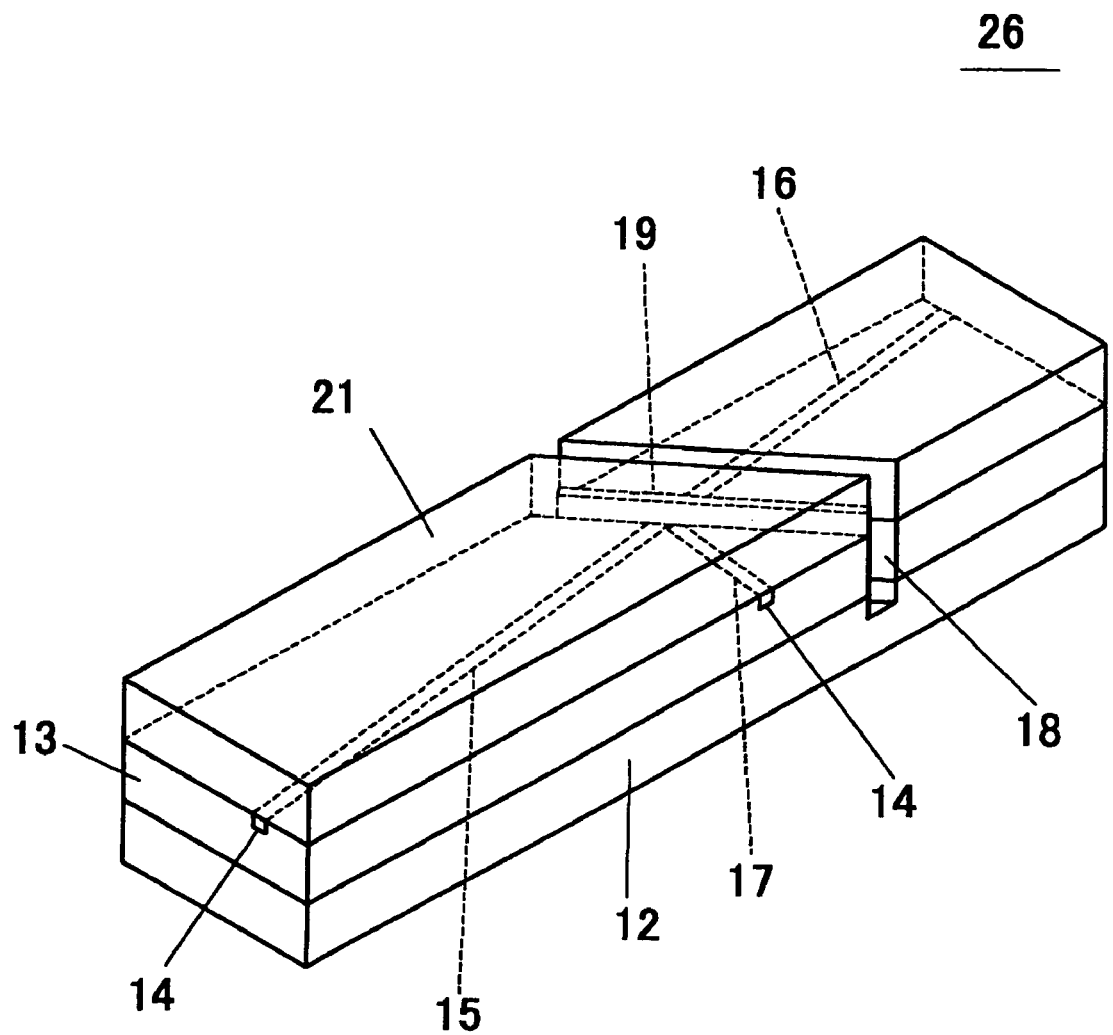
FIG. 14 shows a plan view of a light transceiver according to a third embodiment of the invention.

FIG. 14 is a perspective view showing an optical multiplexer/demultiplexer 26 according to a third embodiment of the invention, FIG. 15A a plan view of the optical multiplexer/demultiplexer 26 free of the upper cladding layer 21, and FIGS. 15B, 15C partly enlarged views of FIG. 15A.

Figure 15:
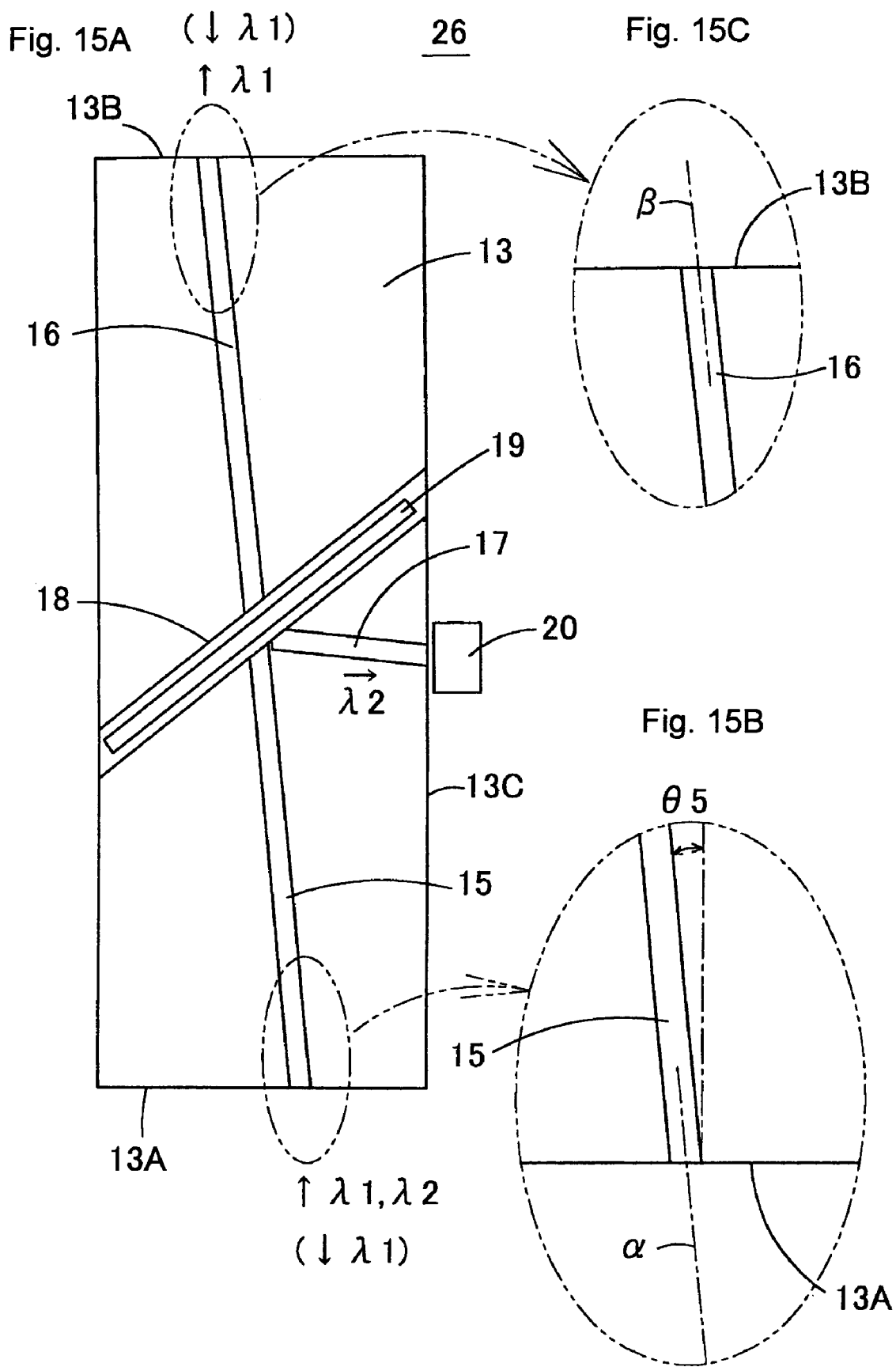
FIG. 15A shows a plan view of the same light transceiver, and FIG. 15B and FIG. 15C partly enlarged views of FIG. 15A.
Figure 16:
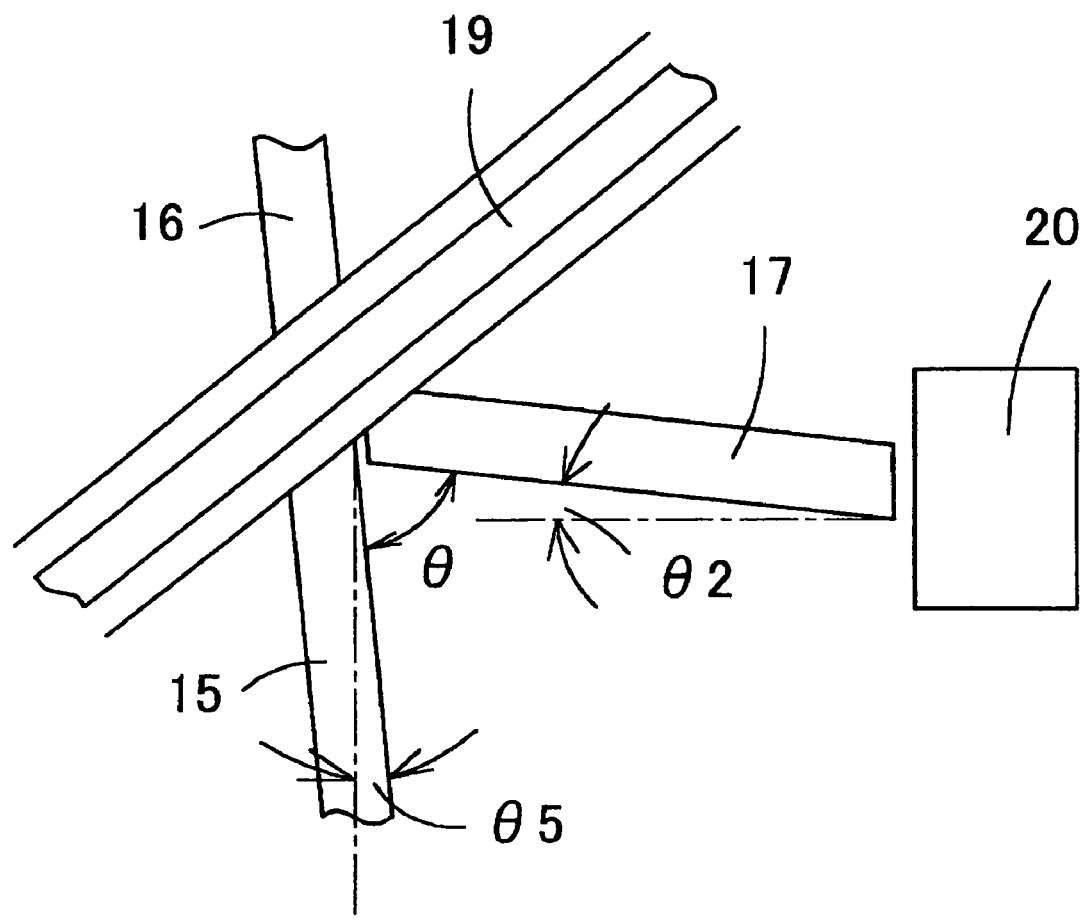
FIG. 16 shows a diagram for explaining the operation of the light transceiver according to the third embodiment of the invention.

FIG. 16 is a partly enlarged view of the neighborhood of the core 17 in FIG. 15A. In this optical multiplexer/demultiplexer 26, a rectangular tabular lower cladding layer 13 is formed on the substrate 12. Three cores 15, 16, 17 are formed in the core groove 14 formed in the surface of the lower cladding layer 13. The core 15 (first core) and the core 16 (third core) make up a linear main core. The cores 15 and 16 are optically coupled to each other through a thin-film filter 19 therebetween. The outer end surfaces of the cores 15, 16 reach the end surfaces 13A, 13B, respectively, of the lower cladding layer 13.

One end surface of the core 17 (second core) is also in opposed relation to the thin-film filter 19. The core 17 is arranged on the same side of the thin-film filter 19 as the core 15 in such a manner as to be optically coupled with the core 15 through the thin-film filter 19. The other end surface of the core 17 reaches the side surface 13C of the lower cladding layer 13. The core 17 is arranged adjacently to the side surface of the core 15 with an intermediate gap of 3 to 15 μm. A lower cladding layer 13 is interposed between the side surface of the core 15 and the core 17. Also, the upper surface of the lower cladding layer 13 and the cores 15, 16, 17 is covered with a rectangular tabular upper cladding layer 21.

As shown in FIG. 15, the core 15, though formed linearly, is not parallel, in a plan view, to the side surface 13C (the side surface to which the end surface of the core 17 far from the thin-film filter 19 is exposed) of the lower cladding layer 13, but tilted diagonally with respect to the side surface 13C. Specifically, the core 15 is tilted in such a manner that the distance d1 from the side surface 13C of the lower cladding layer 13 to the core 15 is decreased from the side of the core 15 near to the thin-film filter 19 progressively toward the end portion of the core 15 located far from the thin-film filter 19. The direction parallel to the optical axis α of the core 15, therefore, is not perpendicular but at an angle to the direction perpendicular to the end surface of the core 15 far from the thin-film filter 19 or the end surface 13A of the lower cladding layer 13.

In similar fashion, the core 16, though formed linearly, is not parallel, in a plan view, to the side surface 13C of the lower cladding layer 13 but tilted with respect to the side surface 13C. Specifically, the core 16 is tilted in such a manner that the distance d2 from the side surface 13C of the lower cladding layer 13 to the core 16 is increased from the side of the core 16 near to the thin-film filter 19 progressively toward the end portion of the core 16 located far from the thin-film filter 19. The direction parallel to the optical axis β of the core 16, therefore, is not perpendicular but at an angle from the direction perpendicular to the outer end surface of the core 16 or the end surface 13B of the lower cladding layer 13.

Incidentally, also according to this embodiment, the core 15 has such a width that the light having the wavelength λ1, λ2 propagates in single mode therethrough, and the core 16 has such a width that the light having the wavelength λ1 propagates therethrough in single mode. Also, the core 17 has such a width that the light having the wavelength λ2 propagates therethrough in multiple mode. In this way, even in the case where the thin-film filter 19 is displaced to some degree, the coupling efficiency between the demultiplexed light reflected on the thin-film filter 19 and the core 17 is desirably kept secure.

In the optical multiplexer/demultiplexer 26 according to the third embodiment, the direction of the optical axis α of the core 15 is tilted with respect to the side surface 13C of the lower cladding layer 13. Therefore, the core 15 is not required to be curved and can be formed linearly. In the case where the core 15 is curved, on the other hand, the need of gradually curving the core 15 increases the length of the optical multiplexer/demultiplexer 26 longitudinally of the core 15. A linear core 15, however, eliminates the need of the length to curve the core 15, thereby making it possible to shorten the optical multiplexer/demultiplexer 26. As a result, the linear core 15 is tilted with respect to the side surface 13C of the lower cladding layer 13 (i.e. the core 15 is arranged to satisfy the relation $\theta 5>0$, where $\theta 5$ is the angle that the optical axis $\alpha$ of the core 15 forms with the side surface 13C of the lower cladding layer 13), and the angle $\theta 5$ that the core 15 forms with the side surface 13C (hereinafter referred to as the tilt angle of the core 15) is minimized. In this way, the size of the optical multiplexer/demultiplexer 26 can be reduced. Also, since the length of the core 15 can be decreased, the insertion loss is reduced for the core 15 made of a material such as a resin having a large material loss. Further, a linear form of the core 15 can eliminate the insertion loss which otherwise might be caused by the curved portion, thereby reducing the insertion loss of the core 15. An excessively small tilt angle $\theta 5$ of the core 15, on the other hand, would increase the branching angle $\theta$ between the core 15 and the core 17, resulting in an increased polarization dependency. Especially, a parallel arrangement of the core 15 and the side surface 13C deteriorates the polarization dependency. The core 15, therefore, is required to be tilted to some degree.

Next, the desirable range of the tilt angle $\theta 5$ of the core 15 is studied. As shown in FIG. 16, assume that the core 15 is tilted by $\theta 5$ with respect to the length (the direction parallel to the side surface 13C) of the optical multiplexer/demultiplexer 26 and by $\theta 2$ (hereinafter referred to as the tilt angle of the core 17) with respect to the width of the optical multiplexer/demultiplexer 26. The angles $\theta 5$ and $\theta 2$ and the branching angle $\theta$ between the cores 15 and 17 hold the relation $\theta 5+\theta+\theta 2=90$ degrees. The tilt angle $\theta 2$ of the core 17 is desirably determined in the range not more than 35 degrees taking the waveguide size into consideration, as described above. Also, the branching angle $\theta$ is desirably 80 degrees or less. Taking the variations thereof into consideration, on the other hand, the branching angle is desirably 60 degrees or less. Thus, the tilt angle $\theta 5$ of the core 15 should satisfy the relation $\theta 5>0$. Taking the light-receiving efficiency, etc. of the light-receiving element 20 and the polarization dependency into consideration, however, the tilt angle $\theta 5$ of the core 15 is desirably large to some degree to the extent that the size of the optical multiplexer/demultiplexer 26 is not increased. Experiments show that the relation desirably holds that $\theta 5$ is larger than one degree.

Figure 17:
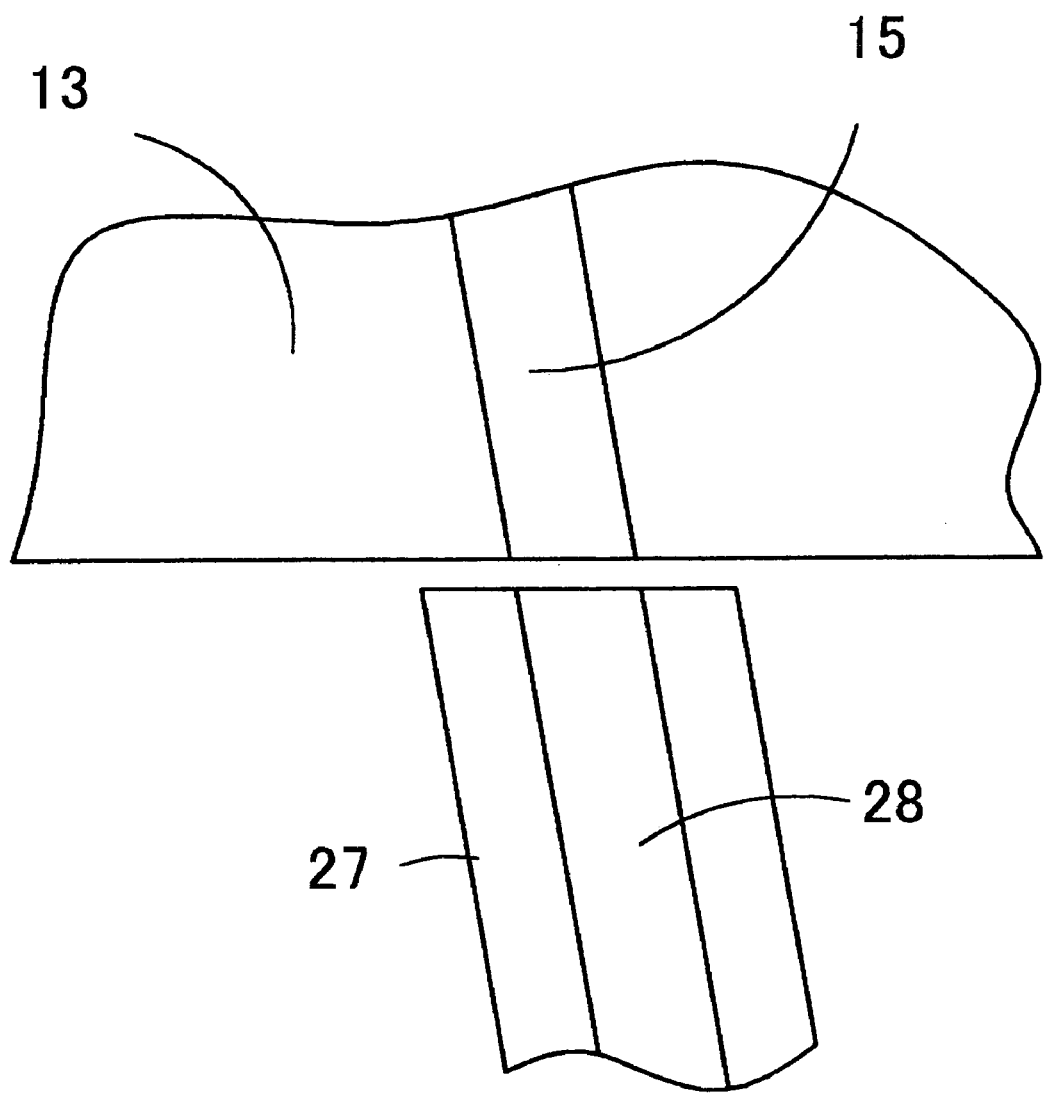
FIG. 17 shows a schematic diagram of an optical fiber coupled to a tilted core.

On the other hand, a large tilt angle $\theta 5$ of the core 15 would lead to a large width of the optical multiplexer/demultiplexer 26 and offsets the advantage of a decreased length of the optical multiplexer/demultiplexer 26. Thus, the upper limit of the tilt of the core 15 is required to be determined taking the width and size of the optical multiplexer/demultiplexer 26 into account. In addition, the optical coupling efficiency between the optical fiber and the core 15 is a required matter of consideration. In order to improve the coupling efficiency between the tilted core 15 and the optical fiber, as shown in FIG. 17, the forward end of the optical fiber 27 is desirably cut diagonally to attain the parallelism between the end surface of the core 15 and the end surface of the optical fiber core 28 (this also holds true for the relation between the light-emitting element or the light-receiving element and the core). By arranging the end surface of the core 15 in parallel to the end surface of the optical fiber core 28 in this way, the same optical coupling efficiency can be secured as if the core 15 is not tilted.

Figure 18:
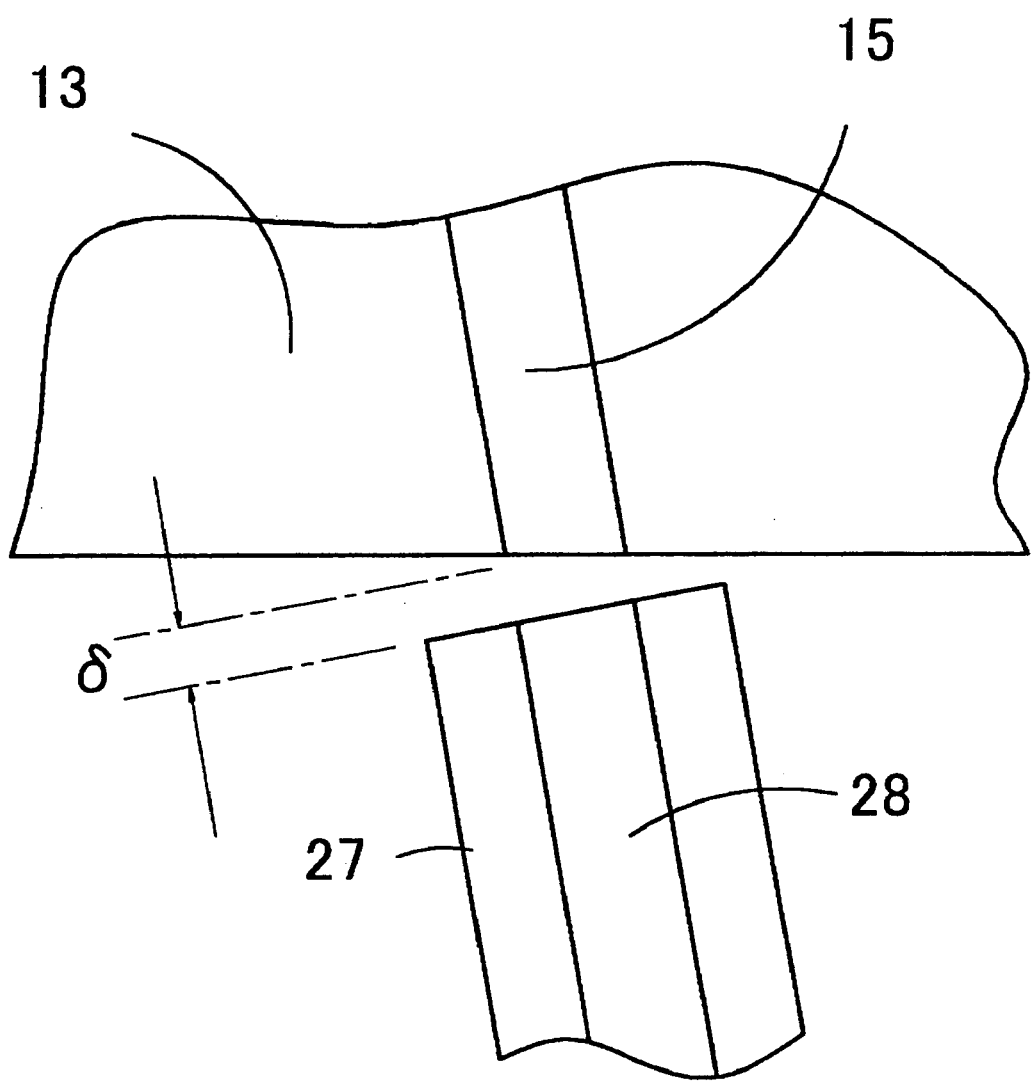
FIG. 18 shows a schematic diagram of an optical fiber having a gap with a core.
Figure 19:
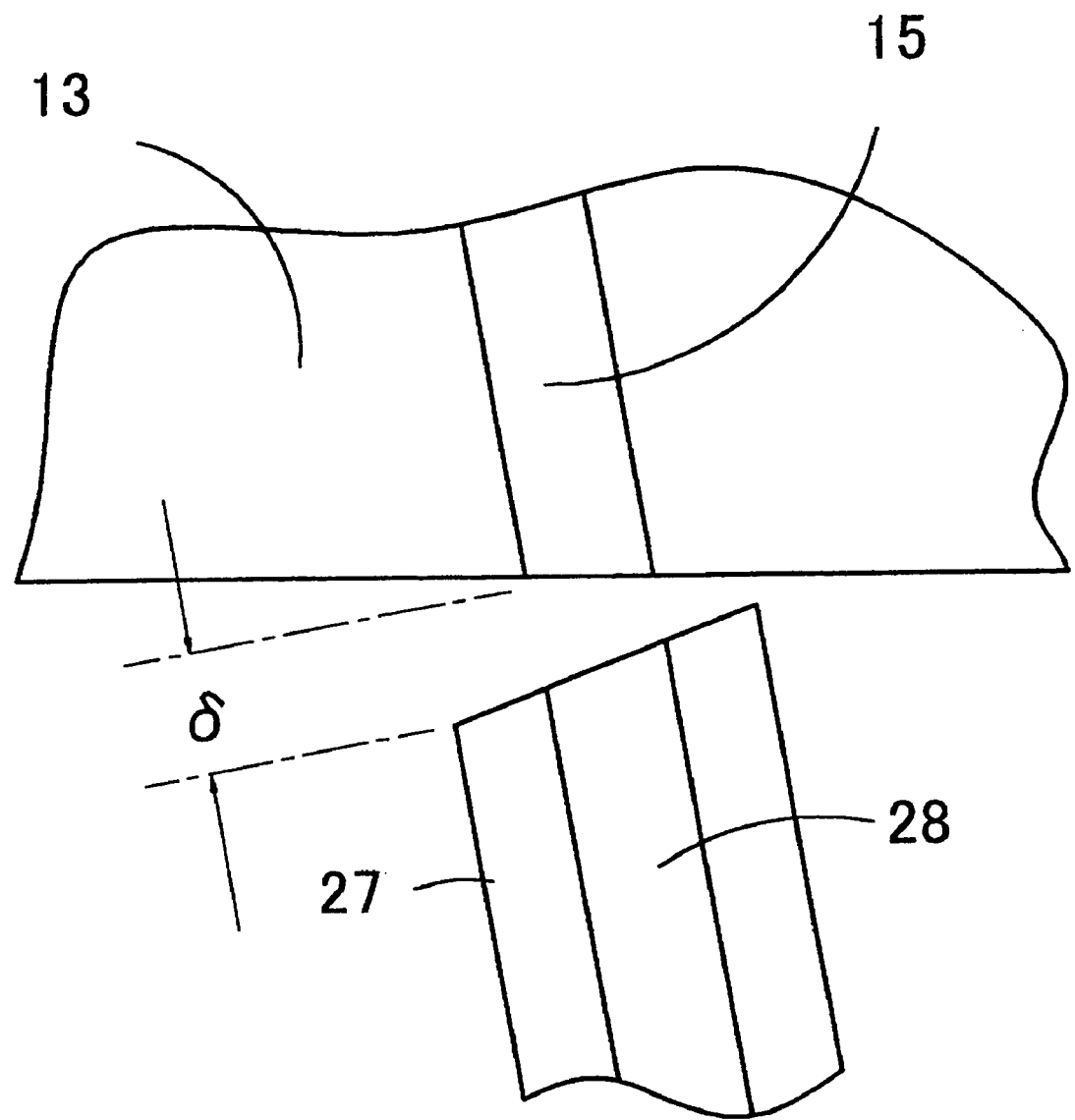
FIG. 19 shows a schematic diagram of an optical fiber having a gap with a core.

In the case where the optical fiber 27 with the forward end thereof cut vertically is connected as shown in FIG. 18, however, a gap $\delta$ is formed between the core 15 and the optical fiber core 28. Also in the case where the optical fiber 27 is used with the forward end thereof diagonally cut, the direction of the optical fiber 27, if rotated by 180 degrees, as shown in FIG. 19, generates a larger gap $\delta$ (about twice as large as the gap shown in FIG. 18). This gap $\delta$ thus formed is larger, the larger the tilt angle $\theta 5$ of the core 15, as seen from FIGS. 18 and 19. With the increase in the gap between the core 15 and the optical fiber core 28, the coupling loss between them is reduced, thereby deteriorating the coupling efficiency between the core 15 and the optical fiber 27. In the case where the tilt angle $\theta 5$ of the core 15 is excessively large, therefore, the coupling efficiency with the optical fiber 27 is liable to decrease depending on the connection of the optical fiber 27.

Figure 20:
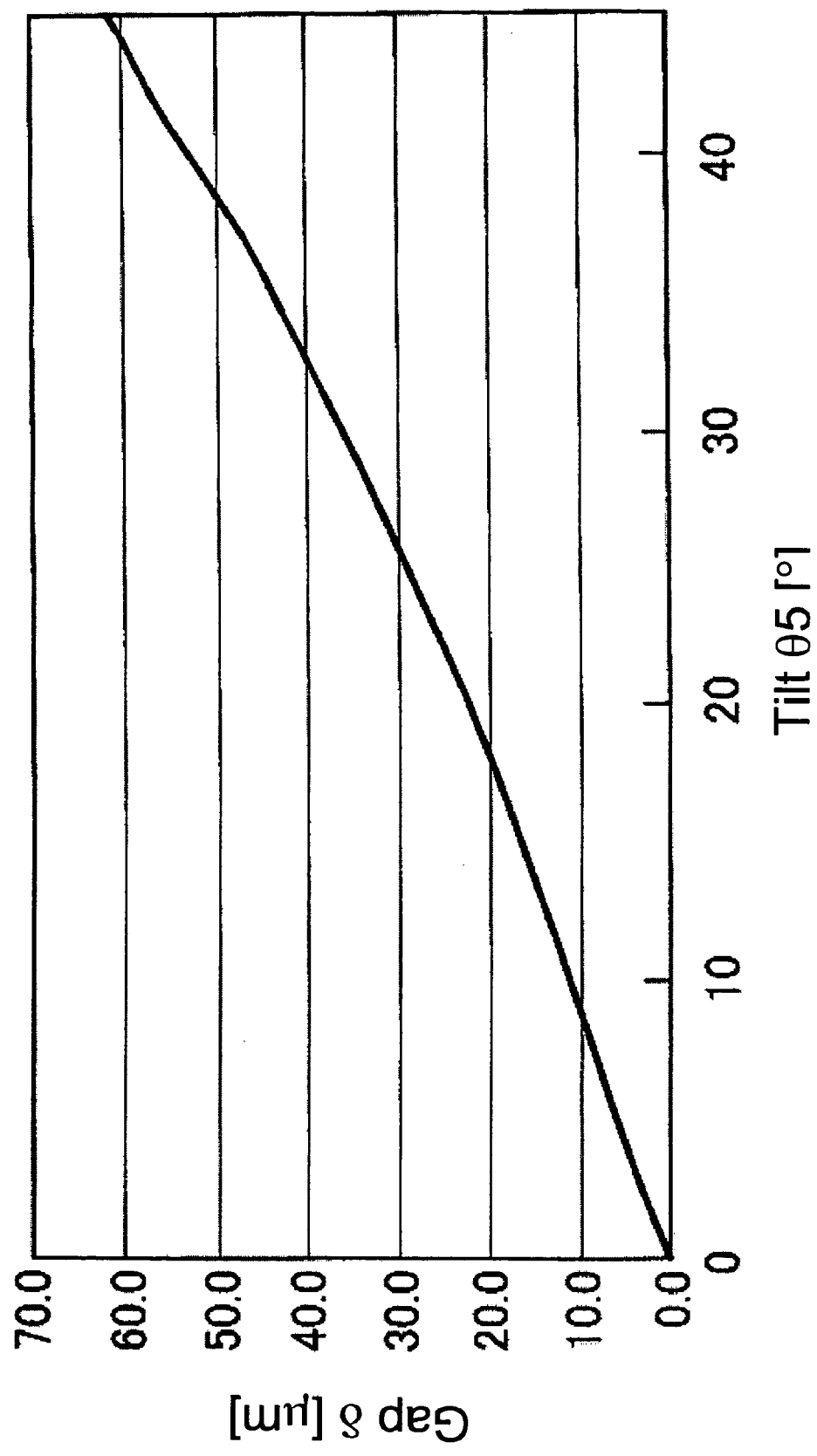
FIG. 20 shows the relation between the core tilt angle $\theta 5$ and the size of the gap between the core and the optical fiber core.
Figure 21:
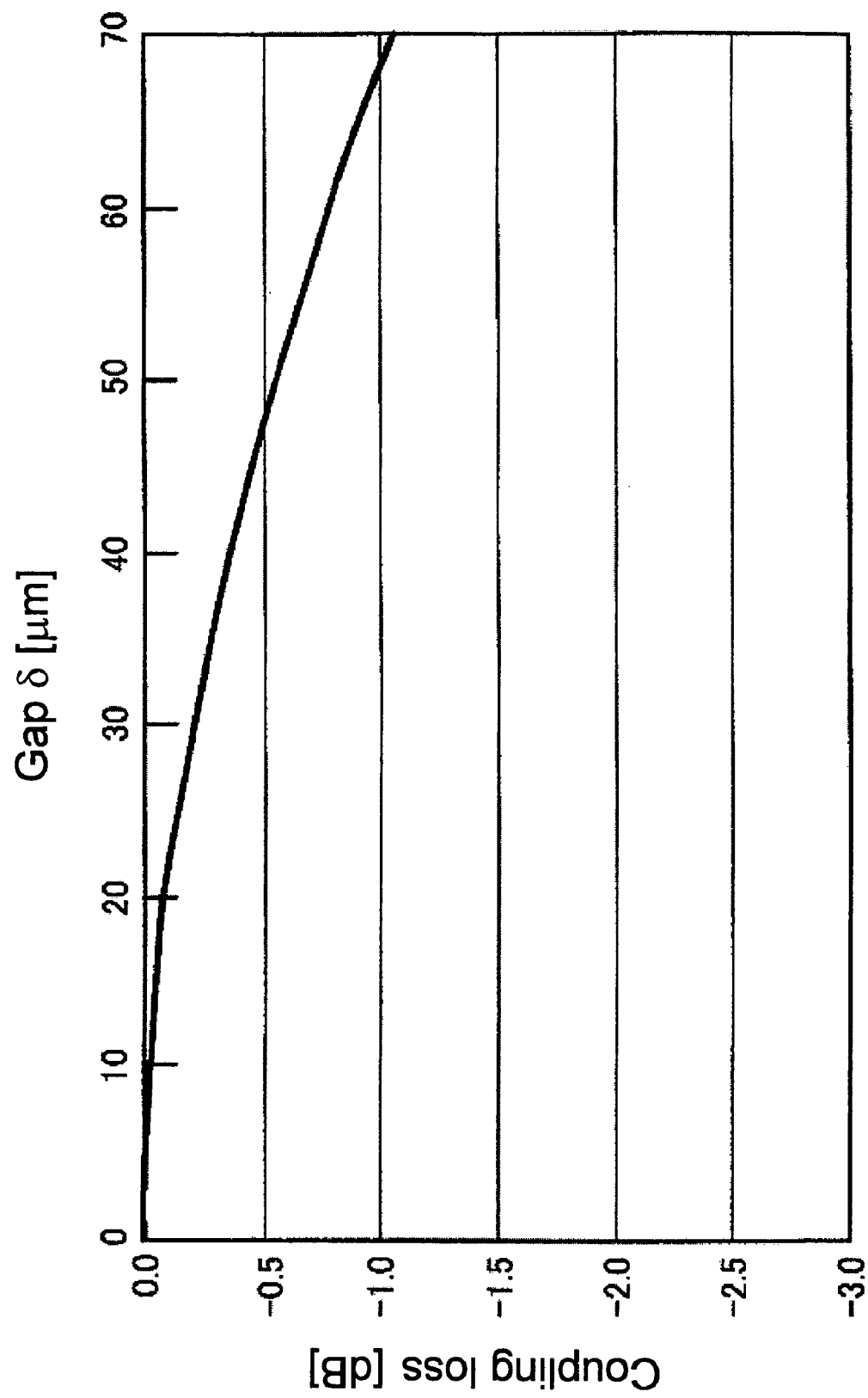
FIG. 21 shows the relation between the size of the gap between the core and the optical fiber and the coupling loss.

FIG. 20 is a diagram showing the tilt angle $\theta 5$ of the core 15 as related to the gap $\delta$ between the core 15 and the optical fiber 27 with the forward end thereof cut vertically as shown in FIG. 18. FIG. 21 is a diagram showing the result of determining, by simulation, the relation between the gap $\delta$ and the light coupling loss between the core 15 and the optical fiber core 28. In FIG. 21, however, the coupling loss is determined by changing the distance between the core 15 perpendicular to the end surface 13A and the optical fiber core 28 with the forward end thereof cut vertically, without taking the return loss into consideration. As understood from FIGS. 20 and 21, as long as the tilt angle $\theta 5$ of the core 15 is not more than about 30 degrees, the gap $\delta$ is 40 μm or less and not significantly large, and the resulting coupling loss of about 0.4 dB is not very large. On the other hand, the tilt angle $\theta 5$ of the core 15 not more than 20 degrees leads to the gap $\delta$ of about 20 μm or less, so that the coupling loss caused by the gap $\delta$ can be suppressed to 0.1 dB or less. In the case where the tilt angle $\theta 5$ of the core 15 is 15 degrees or less, the gap $\delta$ is not more than about 15 μm, and the coupling loss due to this gap $\delta$ is 0.05 dB, which is a substantially ignorable value. Further, the tilt angle $\theta 5$ of the core 15 not more than 10 degrees leads to the gap $\delta$ of about 10 μm or less, so that the coupling loss attributable to the gap $\delta$ is substantially 0 dB.

In the case where the tilt angle $\theta 5$ of the core 15 is 30 degrees or less, the coupling loss due to the gap between the core 15 and the optical fiber core 28 can be suppressed to a small value. Therefore, the tilt angle of the core 15 is desirably kept in the range described below.

$$0°<\theta 5<30°$$

Also, as long as the core 15 is kept tilted at about 6 degrees or more, the return loss at the end surface of the core 15 and the optical fiber core 28 can be reduced. The tilt angle $\theta 5$ of the core 15, therefore, is preferably in the range of 6 to 15 degrees, or more preferably in the range of 7 to 10 degrees. Values especially desirable include the branching angle $\theta$ of 60 degrees, the tilt angle $\theta 2$ of the core 17 at 22 degrees and the tilt angle $\theta 5$ of the core 15 at 8 degrees.

The description above concerns an optical fiber with the forward end thereof cut in vertical position. The same can be said of a case in which the optical fiber with the forward end thereof cut diagonally fails to work satisfactorily or a case in which the optical fiber with the forward end thereof cut diagonally as shown in FIG. 19 is turned by 180 degrees. Especially, in the case where the optical fiber 27 (optical fiber strand) with the forward end thereof cut diagonally is set in position by the V-shaped alignment groove, many steps are required to keep the forward end in exact registry with the end surface of the core 15 at the correct angle. According to this embodiment, in contrast, the optical fiber 27 and the core 15 can be coupled to each other with a small coupling loss and a reduced return loss. Apart from the core 15 about which an explanation is made above, the same can be said of the coupling between the core 16 and the optical fiber, etc.

Figure 22A:
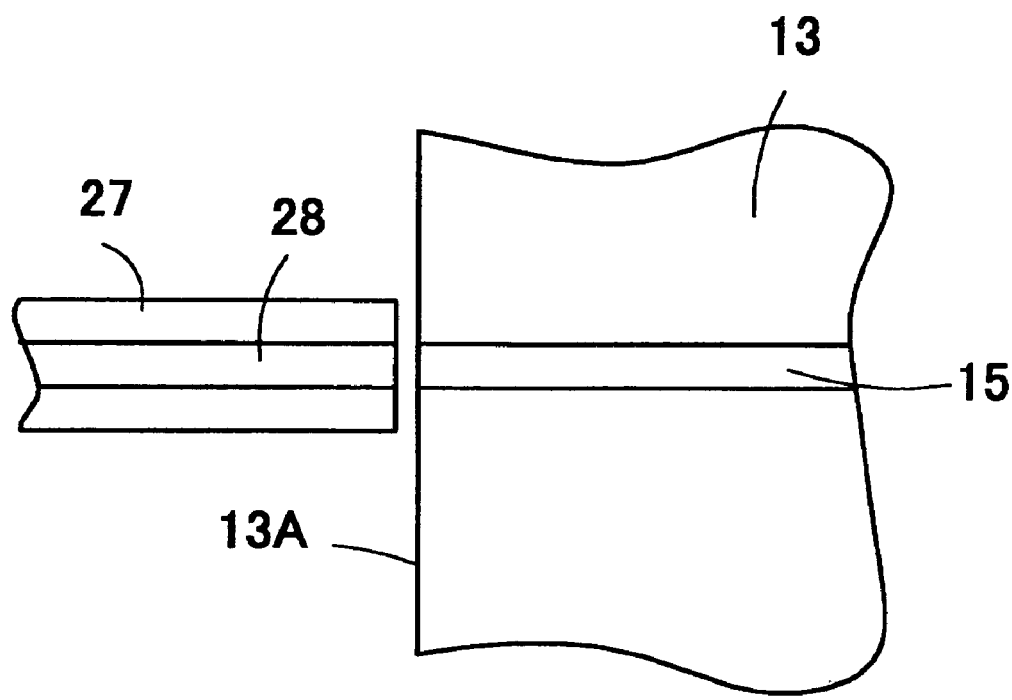
FIGS. 22A, 22B show a plan view and a longitudinal sectional view, respectively, showing the manner in which a gap is formed along the depth between a core and the optical fiber core.
Figure 22B:
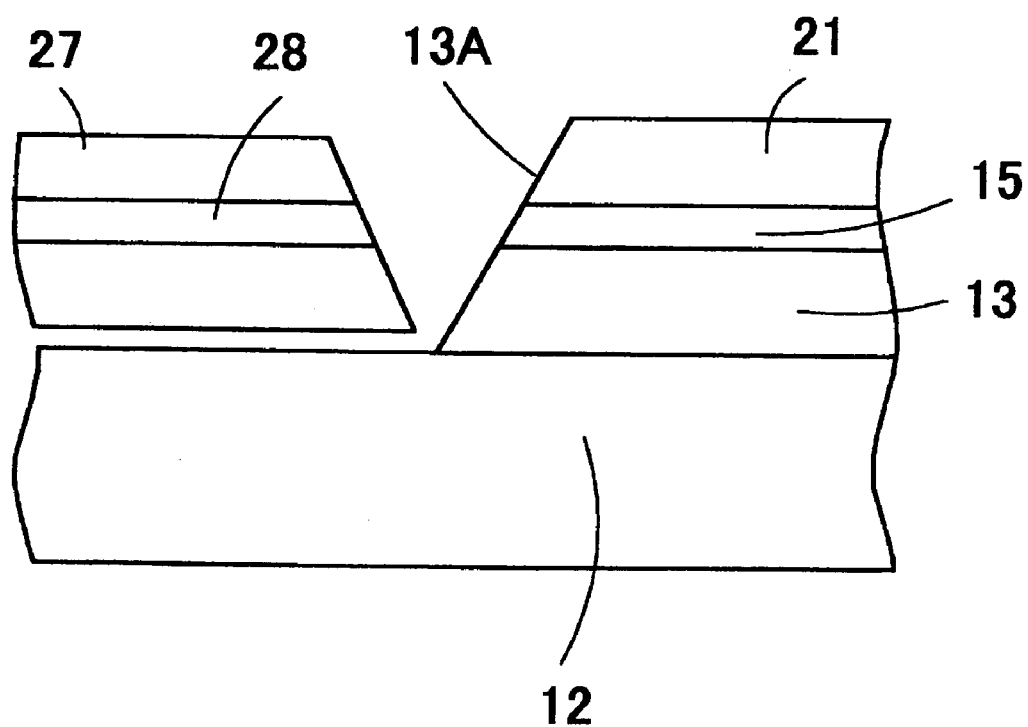

The concept described above is applicable also to a case in which the core 15 is perpendicular to the end surface 13A as shown in the plan view of FIG. 22A. Specifically, as shown in the longitudinal sectional view of FIG. 22B, the return loss can be reduced by tilting the end surface of the core 15 and the forward end of the optical fiber 27 along the depth. In the process, the end surface of the tilted core 15 and the forward end of the optical fiber 27 are desirably parallel to each other. Even in the case where one of them constitutes a vertical surface or the end surface of the tilted core 15 and the forward end of the optical fiber 27 are liable to fail to be parallel to each other, however, the coupling loss can be suppressed to a small value by keeping the tilt angle of the end surface of the tilted core 15 or the forward end surface of the tilted optical fiber 27 within the range described above.

For a similar reason, the size of the optical multiplexer/demultiplexer 26 can be reduced by making a linear core 16 and tilting the core 16 with respect to the length of the optical multiplexer/demultiplexer 26. In this case, the direction in which the optical axis β of the core 16 is tilted is, restricted by the coupling efficiency with the core 15. Normally, however, the tilt of the core 16 desirably has the same tilt angle as the core 15.

Figure 23:
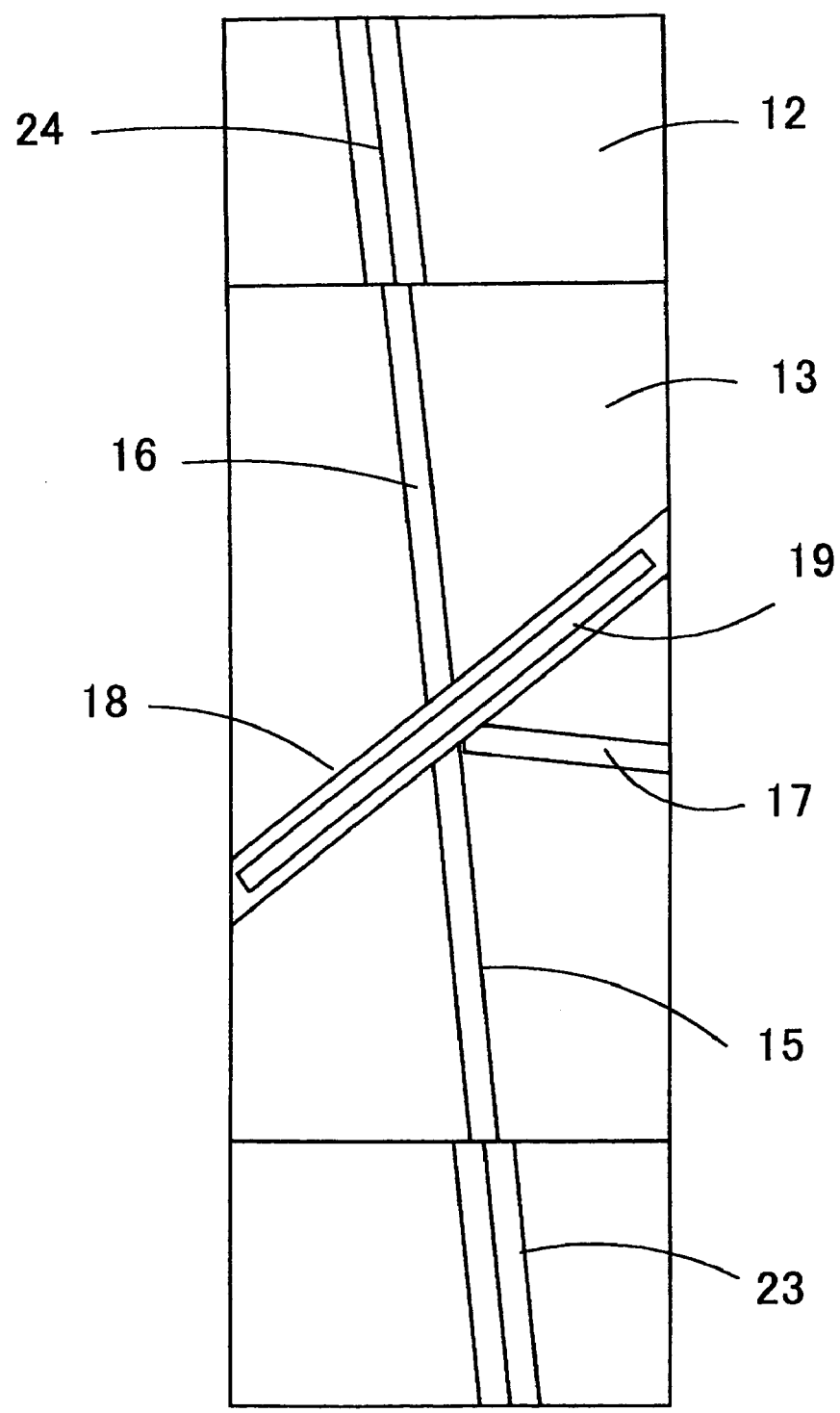
FIG. 23 shows a plan view of the optical multiplexer/demultiplexer according to a modification of the third embodiment.

Also, according to this embodiment, in the case where the optical fiber is connected to the cores 15, 16, as in the optical multiplexer/demultiplexer 29 shown in FIG. 23, the V-shaped alignment grooves 23, 24 may be formed on the part of the substrate 12 where the cores 15, 16 and the optical fiber are coupled to each other.

Figure 24:
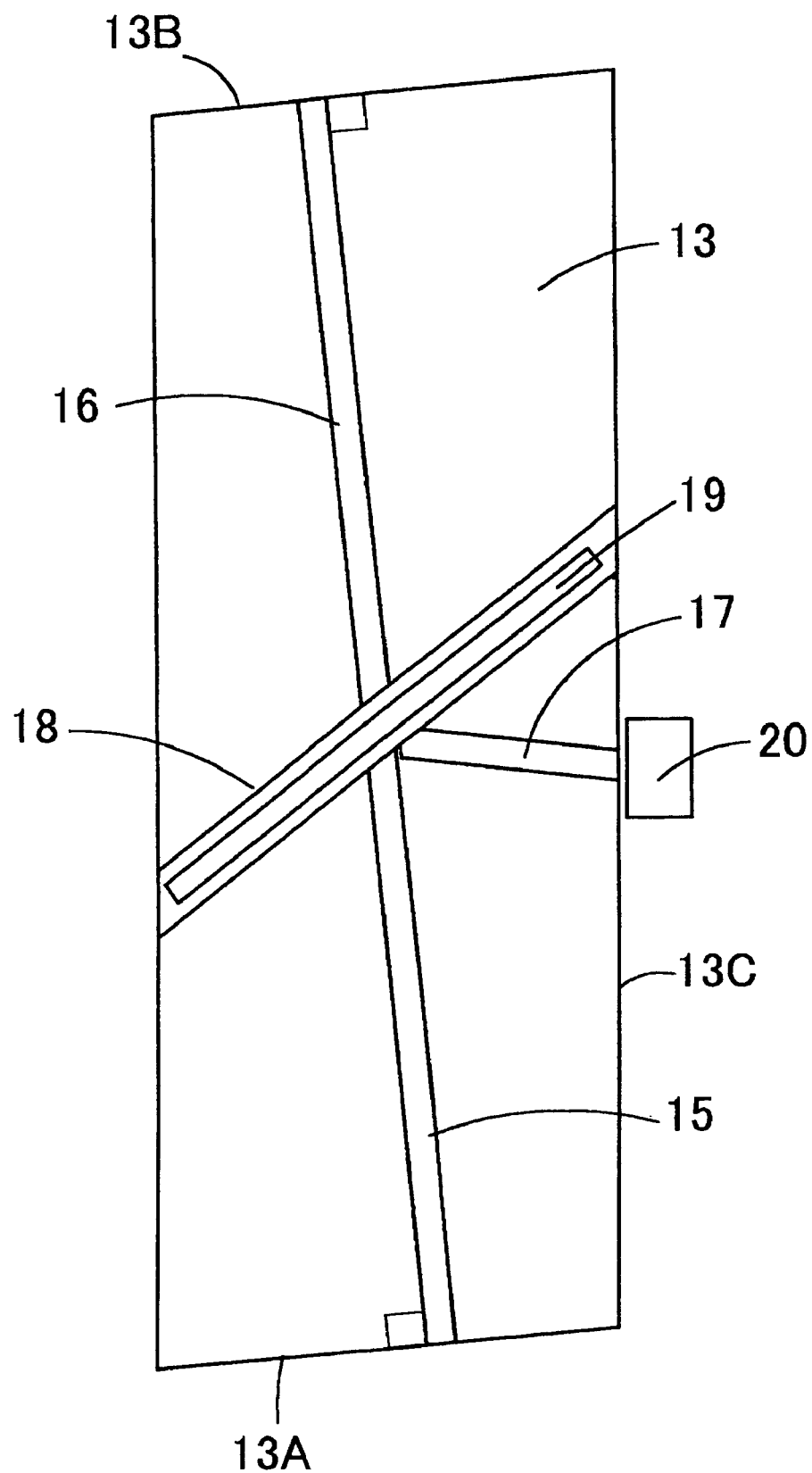
FIG. 24 shows a plan view of the optical multiplexer/demultiplexer according to another modification of the third embodiment.

In order to prevent the gap from being formed between the core of the optical fiber with the end surface thereof cut vertically and the cores 15, 16 of the optical multiplexer/demultiplexer, as shown in FIG. 24, the end surfaces 13A, 13B of the lower cladding layer 13 are kept at right angles to the optical axis of the cores 15, 16, respectively. As a result, in the modification shown in FIG. 24, the lower cladding layer 13 assumes a parallelogram (though not shown, this is also the case with the upper cladding layer 21).

Fourth Embodiment

Figure 25:
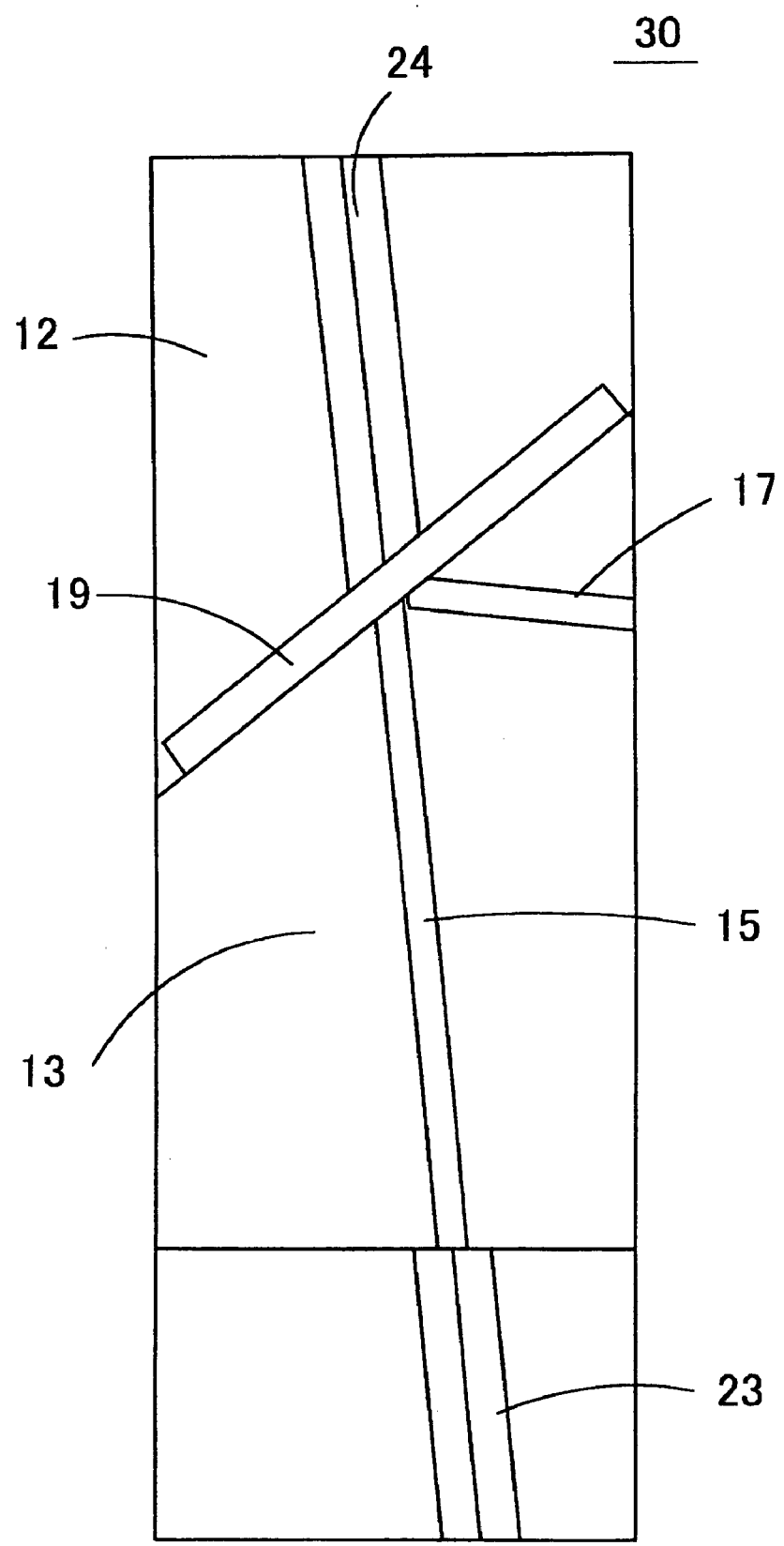
FIG. 25 shows a plan view of the optical multiplexer/demultiplexer according to a fourth embodiment of the invention.

FIG. 25 is a plan view showing an optical multiplexer/demultiplexer 30 according to a fourth embodiment of the invention, in which the upper cladding layer 21 is not shown. In this optical multiplexer/demultiplexer 30, the core 16 is not included unlike in the third embodiment, and a thin-film filter 19 is attached to the end surface of the lower cladding layer 13 at a position in opposed relation to the linear core 15 and the core 17. The light having the wavelength λ1 that has branched in the thin-film filter 19 directly enters the optical fiber fitted in the alignment groove 24.

Fifth Embodiment

Figure 26:
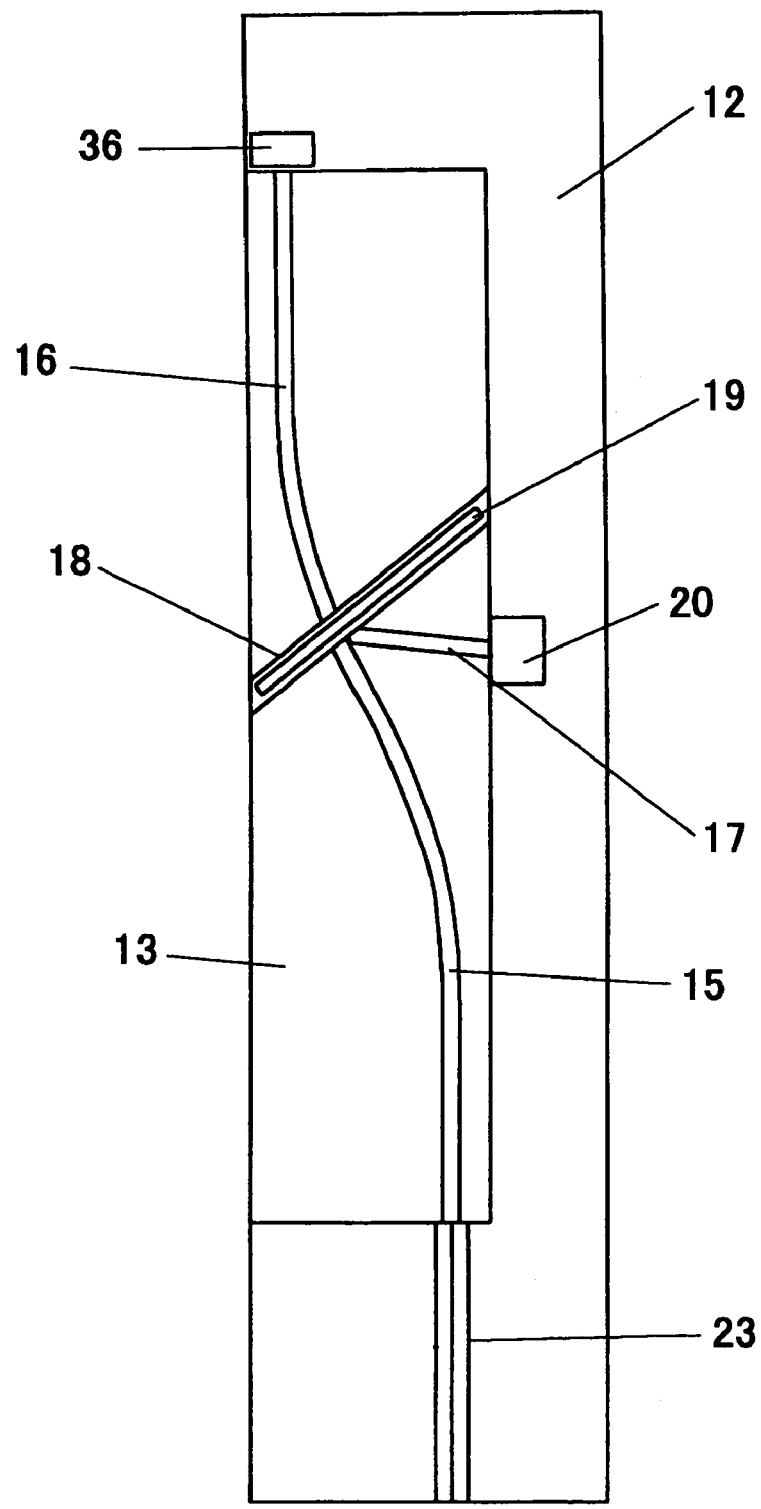
FIG. 26 shows a plan view of the optical multiplexer/demultiplexer according to a fifth embodiment of the invention.

FIG. 26 is a plan view showing a light transceiver 35 according to a fifth embodiment of the invention. This light transceiver 35 comprises a light-emitting element 36 such as a semiconductor laser device in opposed relation to the end surface of the core 16 for emitting the light having the wavelength λ1 and a light-receiving element 20 in opposed relation to the end surface of the core 17. Also, the alignment groove 23 formed in opposed relation to the core 15 is connected with the optical fiber (not shown).

The light-receiving element 20 is mounted to the extreme side end surface of the lower cladding layer 13 and adapted to have the light-receiving angle of about 0 to 35 degrees (preferably, about 20 degrees) with respect to the light emitting direction. The light-receiving element 20 may be mounted on a chip or submount.

The light having the wavelength λ1 emitted from the light-emitting element 36 propagates through the core 16 and enters 15 by way of the thin-film filter 19, followed by being transmitted to the optical fiber. The light having the wavelength λ2 transmitted from the optical fiber, on the contrary, propagates through the core 15 and after being reflected on the thin-film filter 19, enters the core 17 and is received by the light-receiving element 20.

The width of the multimode core 17 connected to the light-receiving element 20 should be not less than 10 μm. Then, a wide margin can be secured against the displacement of the thin-film filter 19 as compared with the single-mode core. In aiming at a higher speed, on the other hand, the noise factor received by the light-receiving element 20 is required to be reduced, and therefore it becomes necessary to reduce the light-receiving area of the light-receiving element 20. In that case, the size of the multimode core 17 is reduced in accordance with the light-receiving surface of the light-receiving element 20 (the core width is set to 60 μm or less, for example, for the light-receiving width of 60 μm of the light-receiving element 20).

Figure 27:
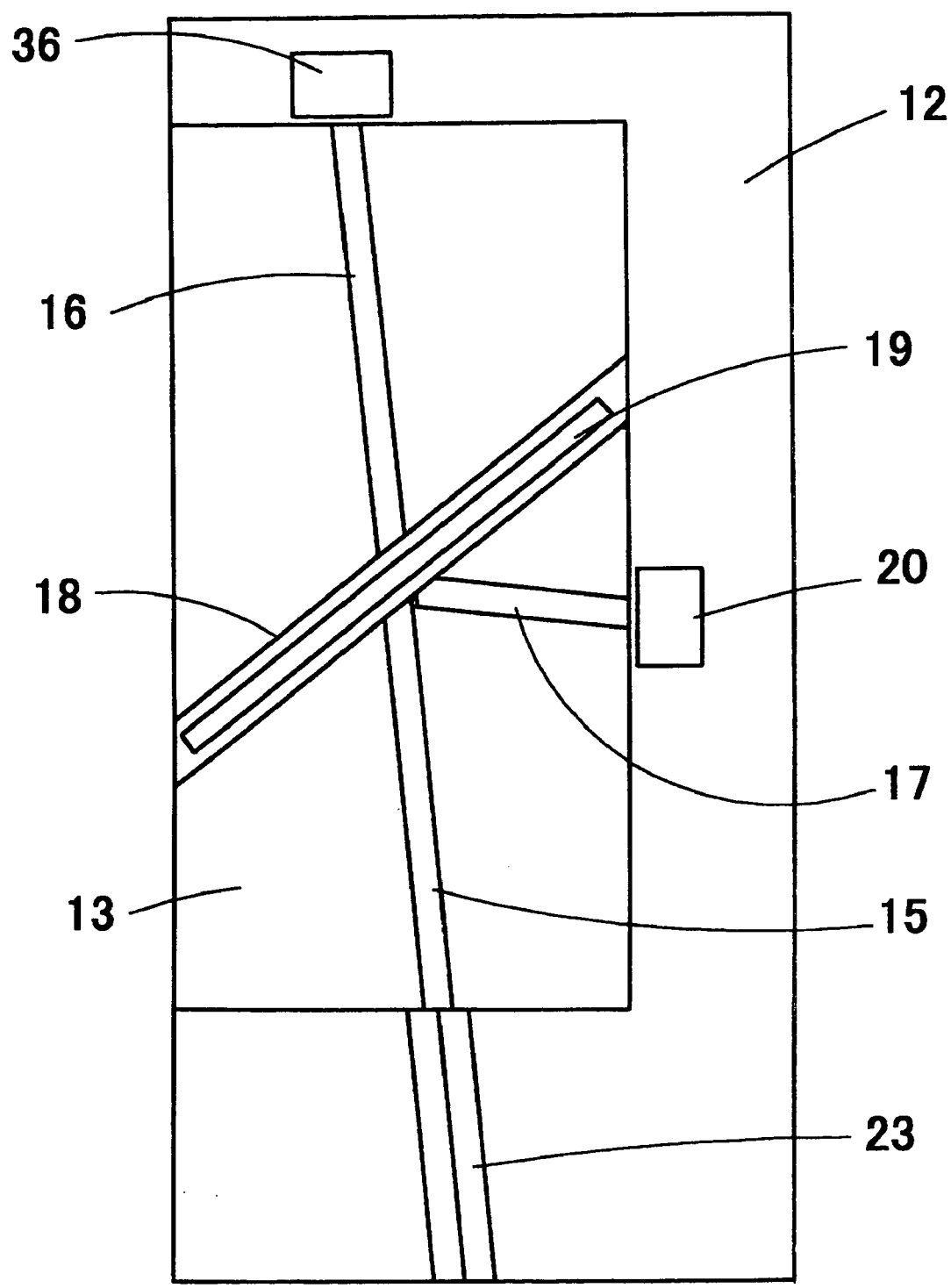
FIG. 27 shows a plan view of a modification of the fifth embodiment of the invention.

FIG. 27 is a plan view showing a light transceiver 37 according to a modification of the fifth embodiment. This light transceiver 37 is different from the light transceiver 35 shown in FIG. 26 in that the light transceiver 37 comprises an optical multiplexer/demultiplexer according to the third embodiment with linear cores 15, 16. In the other respects, the light transceivers 35 and 37 are identical with each other.

Figure 28A:
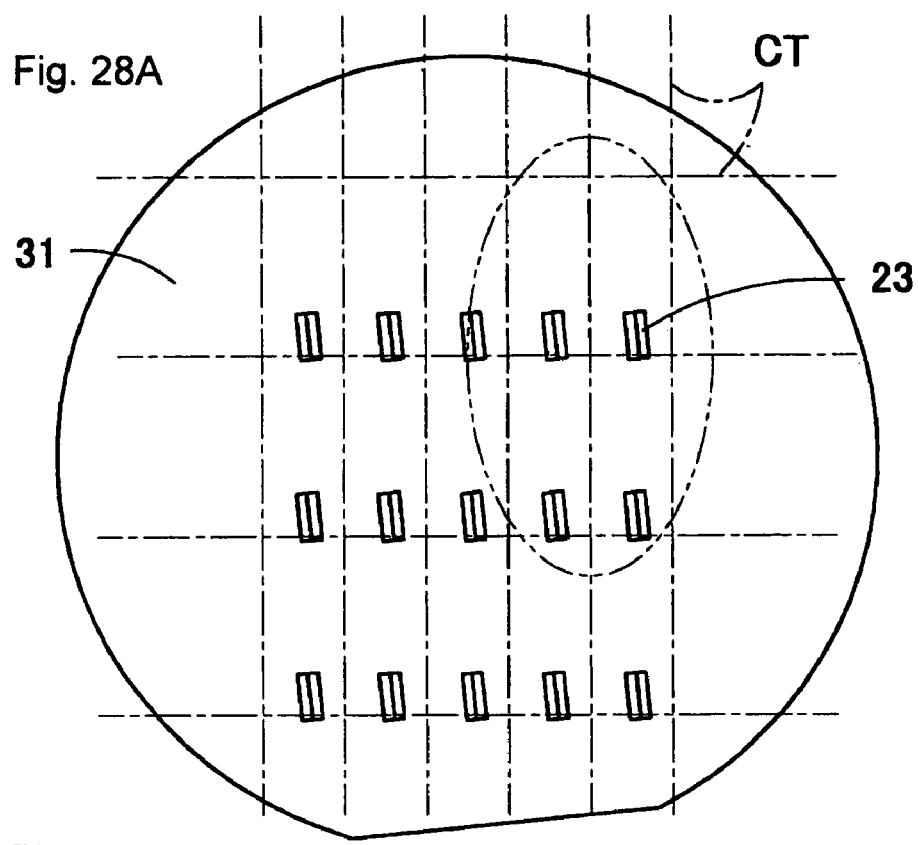
FIG. 28 shows a diagram for explaining the fabrication process according to the same modification.
Figure 28B:
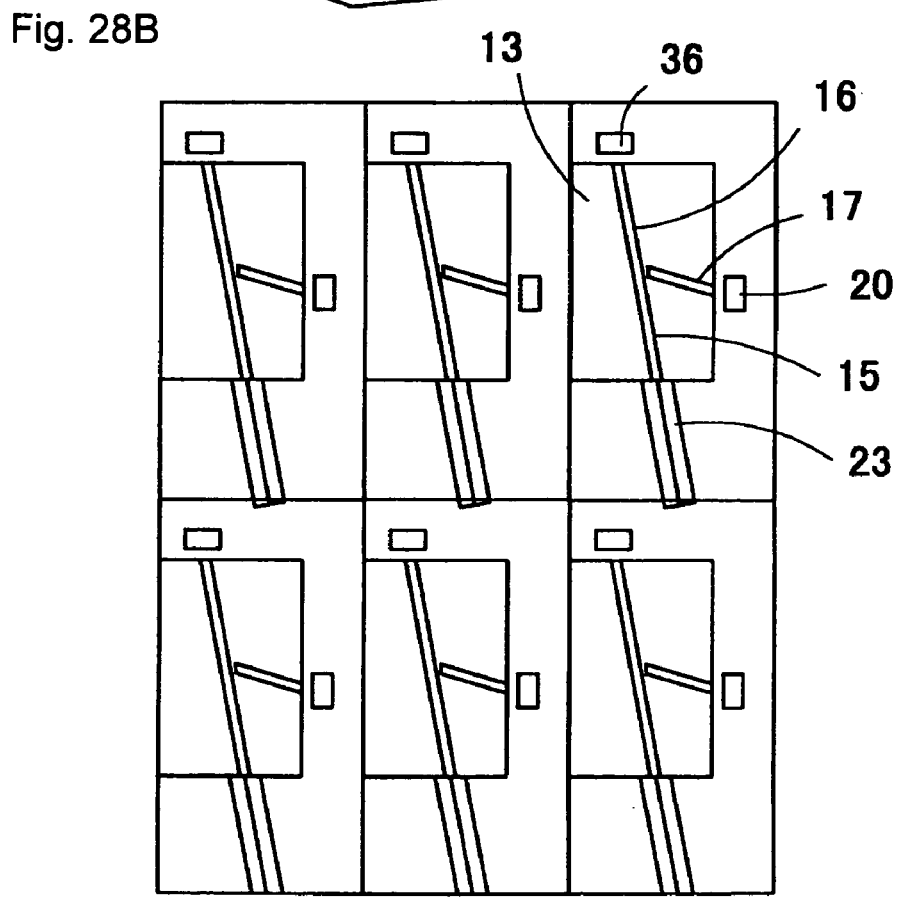

FIGS. 28A, 28B are diagrams for explaining the fabrication steps of the light transceiver 37 shown in FIG. 27. FIG. 28A shows a silicon wafer 31 on which chip areas of a cellular pattern defined by the cut lines CT are assumed. The alignment grooves 23 are collectively formed in the chip areas by anisotropic etching of the silicon wafer 31. The arrangement shown in FIG. 28A makes a parallelism between the alignment grooves 23 in longitudinal direction on the one hand and an arrangement perpendicular to the linear side of the silicon wafer 31 on the other hand. FIG. 28B shows, in enlarged form, the area defined by an ellipse in FIG. 28A. Once the alignment grooves 23 are formed on the silicon wafer 31, as shown in FIG. 28B, the lower cladding layer 13 is formed in each chip area. At the same time, the cores 15, 16, 17 are formed on the upper surface of the lower cladding layer 13, and the upper cladding layer 21 is formed on the cores 15, 16, 17. Also, the light-receiving element 20 and the light-emitting element 36 are mounted in each chip area. After that, the silicon wafer 31 is separated along the cut lines CT, and the light transceiver 37 is formed on the substrate 12 (silicon wafer 31). Then, the slit 18 is cut in the upper surface of each chip by dicer, and the thin-film filter 19 is inserted into the slit 18 thereby to complete the light transceiver 37.

Sixth Embodiment

Figure 29:
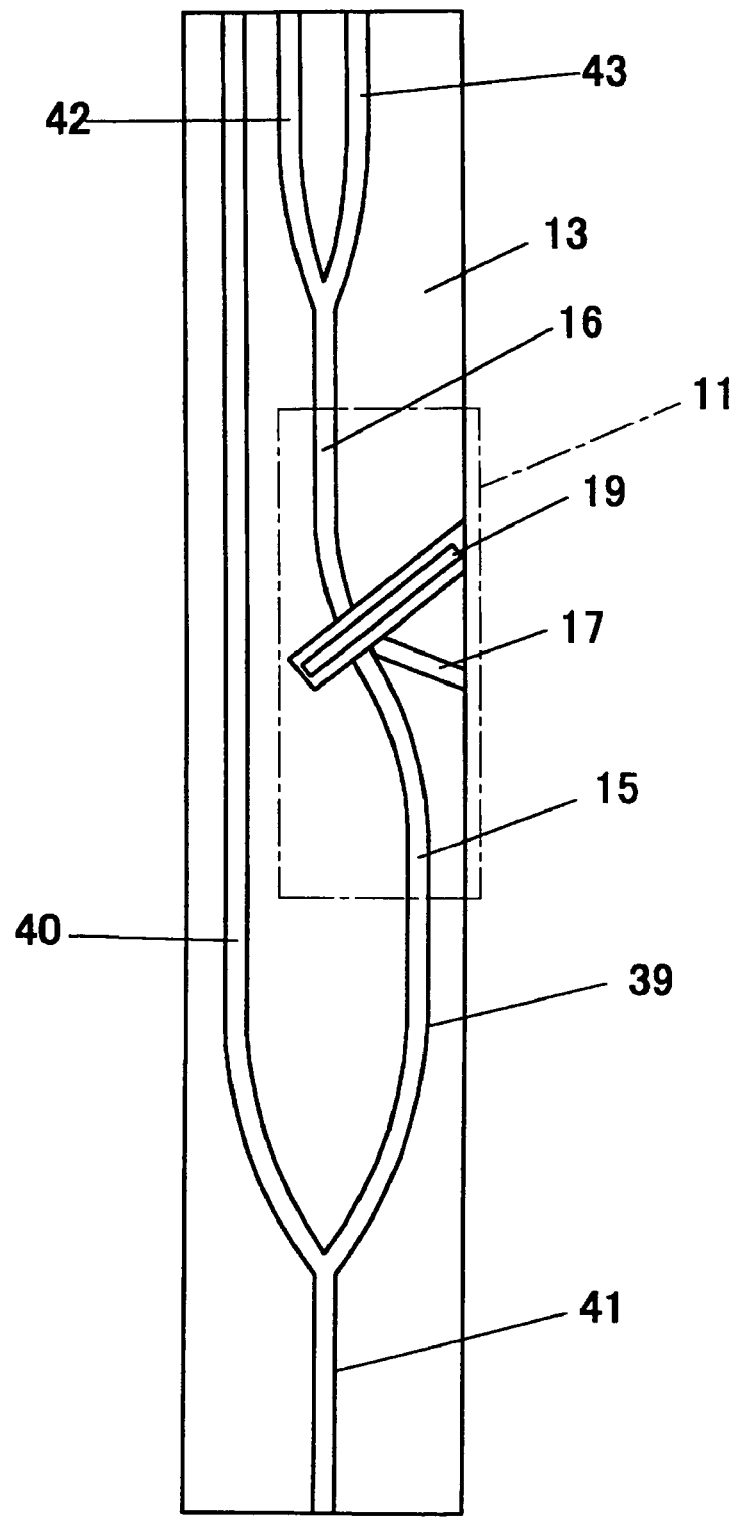
FIG. 29 shows a plan view of the light transceiver according to a sixth embodiment of the invention.

FIG. 29 is a plan view showing an optical integrated circuit 38 according to a sixth embodiment of the invention. This optical integrated circuit 38 comprises the optical multiplexer/demultiplexer 11 according to the first embodiment. A core 41 branches into a core 40 and a core 39, and the core 39 is connected to the core 15 of the optical multiplexer/demultiplexer 11. Also, the core 16 branches into a core 42 and a core 43.

The light having the wavelength λ1 and the light having the wavelength λ2 that have propagated from the core 41 branch into the cores 40 and 39, so that the light having the wavelength λ1 and the light having the wavelength λ2 exit from the end of the core 40. Also, the light that has propagated through the core 39 is transmitted through the core 15, while the light having the wavelength λ2 reflected on the thin-film filter 19 propagates through the core 17 and exits from the end surface of the core 17. The light having the wavelength λ1 that has been transmitted through the thin-film filter 19, on the other hand, propagates through the core 16 and branches into the cores 42 and 43, so that the light having the wavelength λ1 exits from the end surfaces of both the cores 42 and 43.

Figure 30:
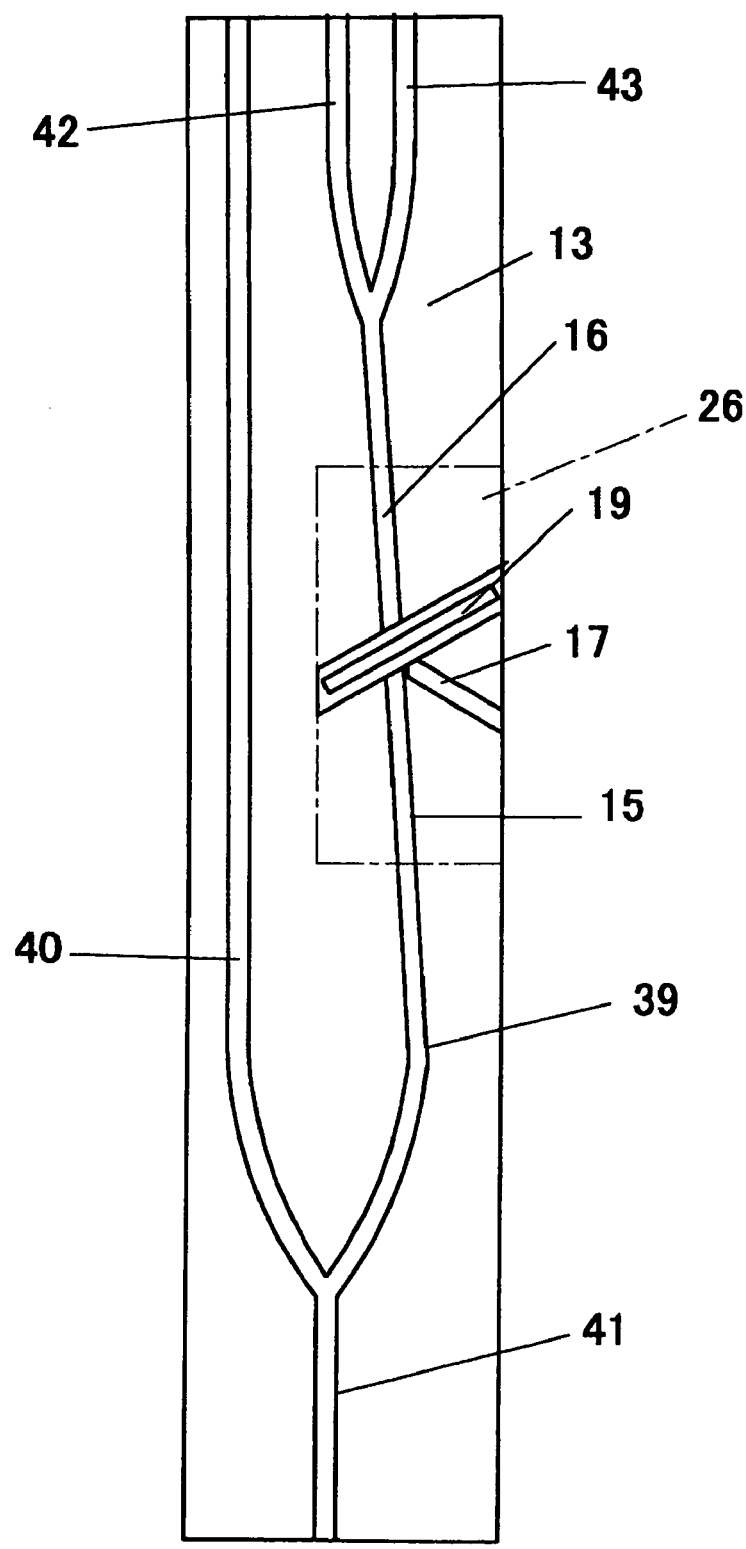
FIG. 30 shows a plan view of a modification of the same embodiment.

FIG. 30 shows a modification of the sixth embodiment. This modification represents an optical integrated circuit 44 using an optical multiplexer/demultiplexer 26 according to the third embodiment having linear cores 15, 16 in addition to multiplexer/demultiplexer 11.

Seventh Embodiment

Figure 31:
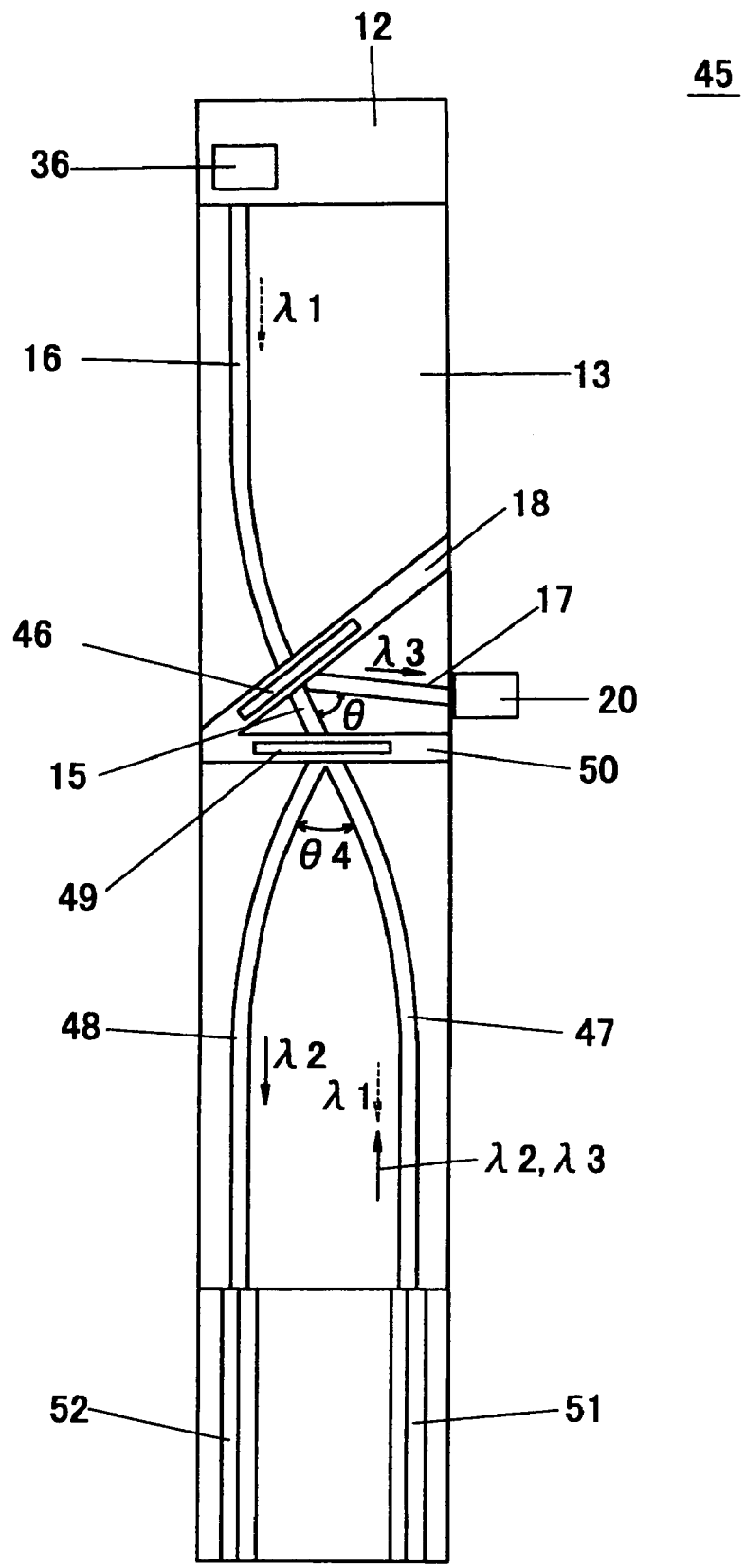
FIG. 31 shows a plan view of the light transceiver according a seventh embodiment of the invention.

FIG. 31 is a plan view showing a light transceiver (3-wavelength light transceiver) 45 according to a seventh embodiment of the invention. In this light transceiver 45, the cores 16 and 15 are arranged in opposed relation to each other in such a manner as to be optically coupled to each other through the thin-film filter 46 on the one hand, and the core 17 having such a width that the light having the wavelength λ3 (=1.49 μm) propagates in multiple mode is optically coupled to the core 15 through the thin-film filter 46 on the other hand. Also, the cores 15 and 47 are arranged in opposed relation in such a manner as to be optically coupled to each other through the thin-film filter 49, and a core 48 is arranged in such a manner as to be optically coupled to the core 47 through the thin-film filter 49. The thin-film filter 46 is inserted in the slit 18 and has such a characteristic as to allow the light having the wavelength λ1 (=1.31 μm) to pass therethrough and reflect the light having the wavelength λ3 (=1.49 μm). The thin-film filter 49, on the other hand, is inserted in the slit 50 and has such a characteristic as to allow the light having the wavelength λ1 (=1.31 μm) and the light having the wavelength λ3 (=1.49 μm) to pass therethrough and reflect the light having the wavelength λ2 (=1.55 μm).

The light-emitting element 36 is arranged on the end surface of the core 16, and the light-receiving element 20 is arranged on the end surface of the core 17. Also, the upper surface of the substrate 12 is formed with V-shaped alignment grooves 51, 52 to set in position the optical fiber connected to the cores 47, 48.

In this light transceiver 45, once the light having the wavelength λ2 and the light having the wavelength λ3 enter the core 47 by way of the optical fiber set in the alignment groove 51, the light having the wavelength λ2, which has propagated through the core 47 together with the light having the wavelength λ3, is reflected on the thin-film filter 49. The light having the wavelength λ2 reflected on the thin-film filter 49 enters the core 48, and propagating through the core 48, is output to the optical fiber set in the alignment groove 52. The light having the wavelength λ3 exited from the end surface of the core 47 and transmitted through the thin-film filter 49, on the other hand, propagates through the core 15 and is reflected on the thin-film filter 46. The light having the wavelength λ3 reflected on the thin-film filter 46 propagates through the core 17 and is received by the light-receiving element 20.

The light having the wavelength λ1 output from the light-emitting element 36 enters the core 16, and propagating through the core 16, enters the core 15 through the thin-film filter 46. The light having the wavelength λ1 that has propagated through the core 15 is transmitted further through the thin-film filter 49 and enters the core 47, and propagating through it, is coupled to the optical fiber in the alignment groove 51.

In this light transceiver 45, the P-S wavelength difference of the thin-film filter 49 is required to be small in order to demultiplex the light having a small wavelength difference between the wavelengths λ2 and λ3. This in turn requires a small branching angle at the thin-film filter 49. In view of this, the branching angle θ4 between the cores 47 and 48 in the thin-film filter 49 is set to 20 degrees, and the branching angle θ between the cores 15 and 17 in the thin-film filter 46 is set to 60 degrees to improve the isolation characteristic. Also, the light-receiving angle (tilt angle θ2 of the core 17) of the light-receiving element 20 is set to 20 degrees.

This light transceiver 45 is reduced in size by employing a structure in the neighborhood of the thin-film filter 46 similar to the optical multiplexer/demultiplexer 11 according to the first embodiment, and has a small branching angle θ4 at the thin-film filter 49. Thus, a compact light transceiver 45 can be obtained, and a three-wavelength light transceiver small in size as a whole can be fabricated.

Figure 32:
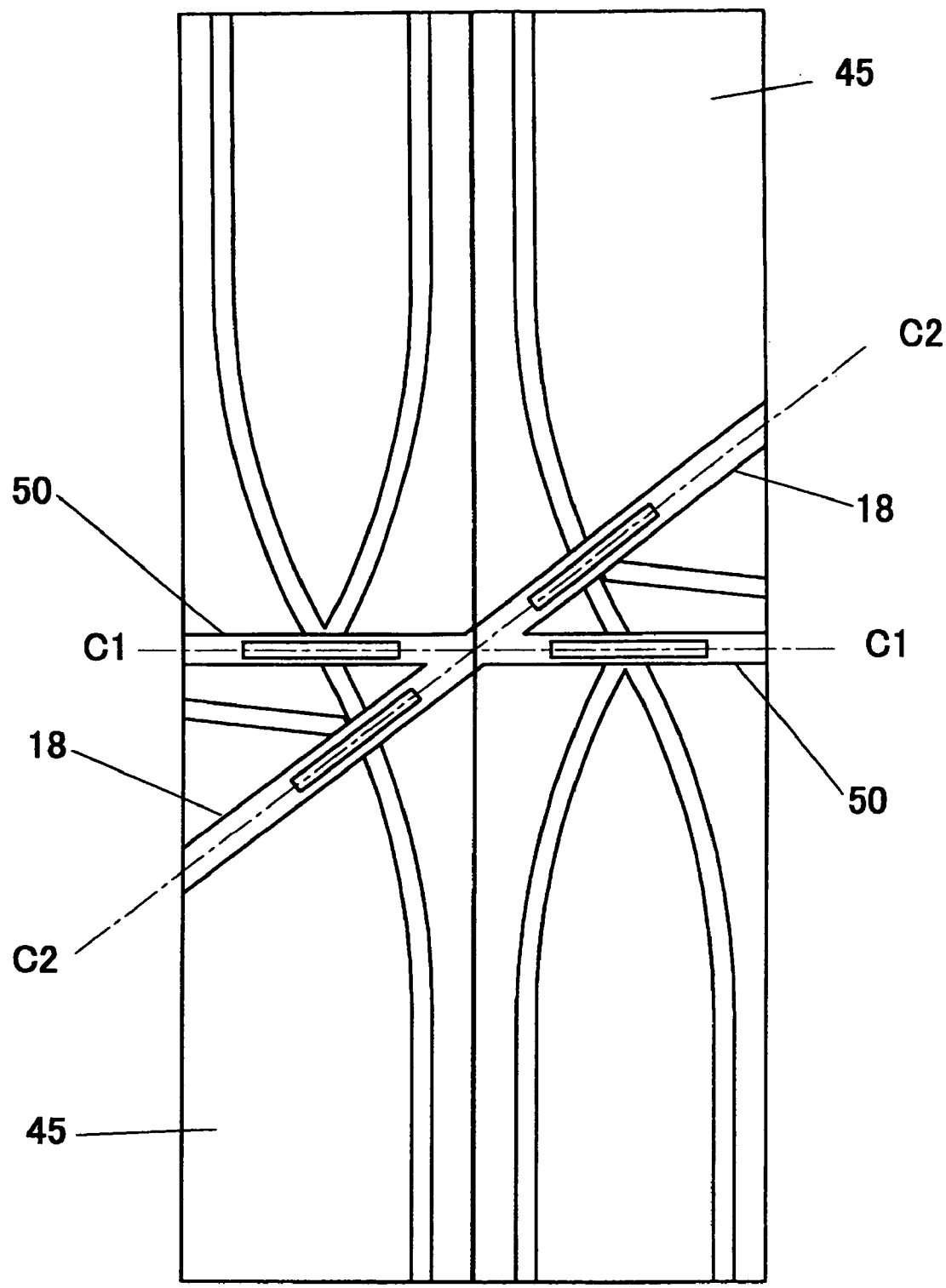
FIG. 32 shows a diagram for explaining the fabrication process of the same light transceiver.

Also, this light transceiver 43 comprises two light transceivers 45 which may be arranged rotationally symmetrically with each other as shown in FIG. 32. Then, the slit grooves 50 are aligned and so are the slits 18. In the case where the arrangement shown in FIG. 32 is employed in the fabrication process, therefore, the slits 50 can be formed at once by dicing along the line C1—C1. In similar fashion, the slits 18 can be formed at a time by dicing along the line C2—C2, thereby improving the fabrication efficiency.

Figure 33:
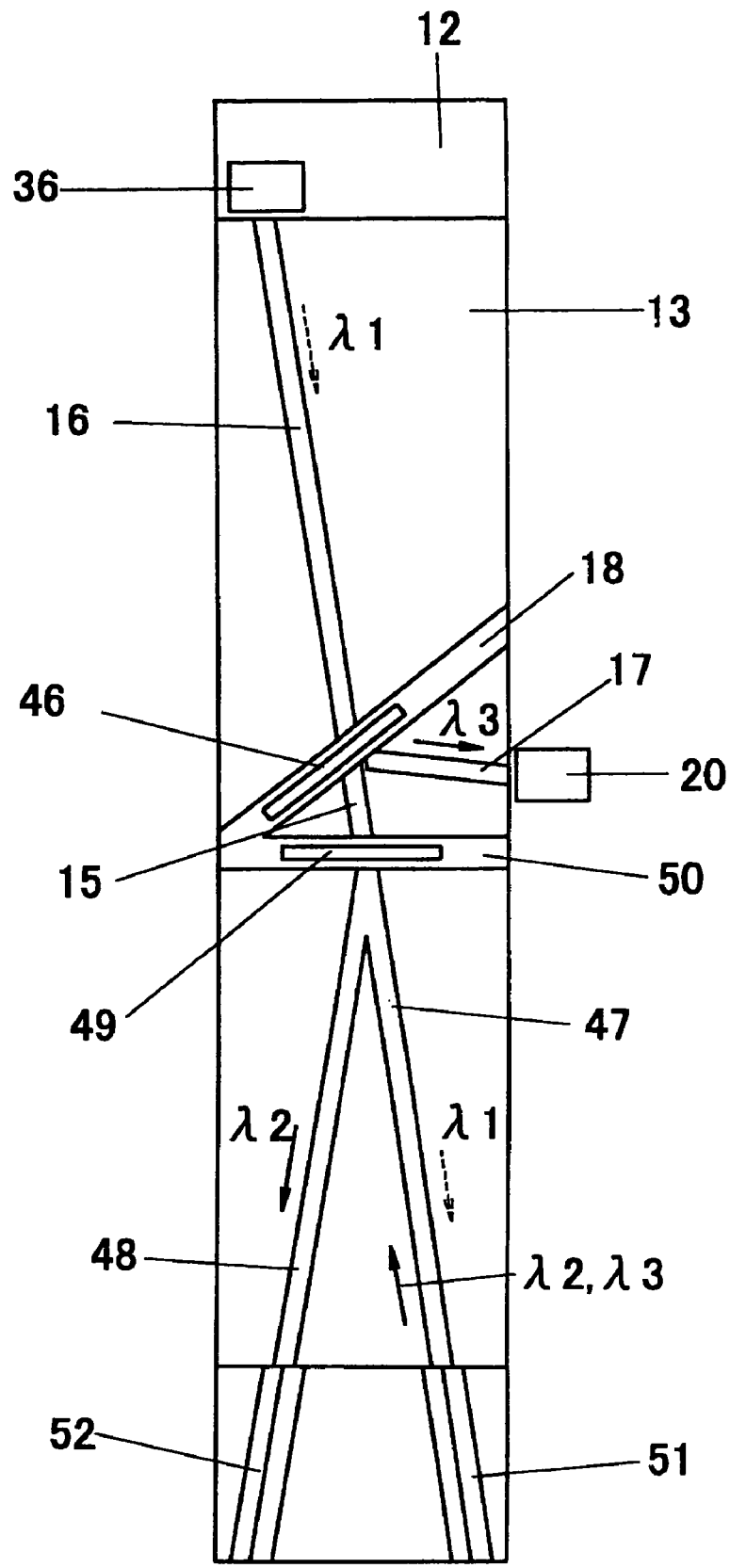
FIG. 33 shows a plan view of the light transceiver according to a modification of the seventh embodiment of the invention.

FIG. 33 shows the light transceiver 45 according to a modification of the seventh embodiment of the invention, in which the cores 15, 16, 57, 48 are formed linearly in the direction at an angle to the side surface of the lower cladding layer 13, and the alignment grooves 51, 52 are formed diagonally correspondingly.

It will thus be understood from the foregoing description of the embodiments that the optical multiplexer/demultiplexer according to the invention can be reduced in size with an improved optical isolation characteristic without increasing the P-S wavelength difference. Thus, both the optical integrated circuit and the light transceiver using the particular optical multiplexer/demultiplexer can be reduced in size with the same optical isolation characteristic.

What is claimed is:

1. An optical multiplexer/demultiplexer comprising at least a first core and a second core arranged in an optical waveguide, wherein one end surface of the first core is arranged in opposed relation to a filter, the second core is arranged on the same side of the filter as the first core in such a manner as to be optically coupled to the first core through the filter, at least a part of the first core is curved in a manner protruded toward the second core, and another end surface of the first core and an end surface far from the filter of the second core are arranged on different sides of the optical waveguide.

2. An optical multiplexer/demultiplexer according to claim 1,
wherein the first core and the second core are optically coupled to each other with an intermediate gap therebetween, and the second core is formed with such a width that the light is propagated in multiple mode.

3. An optical multiplexer/demultiplexer according to claim 1, wherein the second core is in the form of a linear shape.

4. An optical multiplexer/demultiplexer according to claim 2,
wherein the direction of the optical axis at the end portion of the second core far from the filter is tilted from the direction perpendicular to the end surface of the second core far from the filter.

5. An optical integrated circuit, wherein the optical multiplexer/demultiplexer according to claim 1 is mounted on an optically functioning integrated element having composite optical functions.

6. A light transceiver comprising the optical integrated circuit according to claim 5, a light projection element arranged in opposed relation to the end surface of any one of the cores of the optical integrated circuit and a light-receiving element arranged in opposed relation to the end surface of any other one of the cores of the optical integrated circuit.

7. A light transceiver comprising the optical multiplexer/demultiplexer according to claim 1, a light projection element arranged in opposed relation to the end surface of one of the cores of the optical multiplexer/demultiplexer and a light-receiving element arranged in opposed relation to the end surface of any other one of the cores of the optical multiplexer/demultiplexer.

8. An optical multiplexer/demultiplexer comprising at least a first core, a second core and a third core arranged in an optical waveguide,
wherein an end surface of the first core and an end surface of the third core are arranged in opposed relation to each other through the filter in such a manner as to be optically coupled to each other through the filter, the second core is arranged on the same side of the filter as the first core in such a manner as to be optically coupled to the first core through the filter, the first core and the third core each have a curved portion, the curved portion of the first core is formed in a manner protruded toward the second core, the end portion of each of the first and third cores far from the filter reaches a corresponding end of the optical waveguide, and the end portion of the second core far from the filter reaches a side different from the ends of the optical waveguide reached by the first and third cores.

9. An optical multiplexer/demultiplexer comprising
at least a first core and a second core arranged in an optical waveguide,
wherein one end surface of the first core is arranged in opposed relation to a filter, the second core is arranged on the same side of the filter as the first core to be optically coupled to the first core through the filter, and at least a part of the first core is curved in a manner protruded toward the second core, and
wherein the relation holds that θ>2×θ3, where θ3 is the angle formed between the direction of the optical axis at the end portion of the first core far from the filter and the direction of the optical axis at the end portion of the first core near to the filter, and θ is the angle formed between the direction of the optical axis at the end portion of the first core near to the filter and the direction of the optical axis at the end portion of the second core near to the filter.

10. An optical multiplexer/demultiplexer comprising at least a first core and a second core arranged in an optical waveguide,
wherein an end surface of the first core is arranged in opposed relation to a filter, the second core is arranged on the same side of the filter as the first core in such a manner as to be optically coupled to the first core through the filter, and the direction of the optical axis at the end portion of the first core far from the filter is not parallel to an end of the optical waveguide where the end surface of the first core is not located, and
wherein the end surface of the second core far from the filter is located on a side of the optical waveguide different from the end of the optical waveguide where the end surface of the first core far from the filter is located.

11. An optical multiplexer/demultiplexer according to claim 10,
wherein the distance from the end of the optical waveguide where the end surface of the second core far from the filter is located to the first core is progressively decreased from the side of the first core near to the filter toward the side of the first core far from the filter.

12. An optical multiplexer/demultiplexer according to claim 10,
wherein the direction of the optical axis at the end portion of the first core far from the filter is not perpendicular to the end surface of the first core far from the filter.

13. An optical multiplexer/demultiplexer according to claim 10, wherein the first core is in the form of a linear shape.

14. An optical multiplexer/demultiplexer comprising at least a first core, a second core and a third core arranged in an optical waveguide,
wherein an end surface of the first core and an end surface of the third core are arranged in opposed relation to each other through a filter in such a manner as to be optically coupled to each other through the filter, the second core is arranged on the same side of the filter as the first core in such a manner as to be optically coupled to the first core through the filter, and the direction of the optical axis at the end portion of the first core far from the filter is not parallel to the end of the optical waveguide where the end surface of the first core is not located, and
wherein the end surface of the second core far from the filter is located at a side of the optical waveguide different from the end of the optical waveguide where the end surfaces of the first and third cores, respectively, far from the filter are located.

15. An optical multiplexer/demultiplexer according to claim 14, wherein the distance from the end of the optical waveguide where the end surface of the second core far from the filter is located to the first core is progressively decreased from the side of the first core near to the filter toward the side of the first core far from the filter, and the distance from the end of the optical waveguide where the end surface of the second core far from the filter is located to the third core is progressively increased from the side of the third core near to the filter toward the side of the third core far from the filter.

16. An optical multiplexer/demultiplexer according to claim 14,
wherein the direction of the optical axis at the end portion of the third core far from the filter is not perpendicular to the end surface of the third core not opposed to the filter.

17. An optical multiplexer/demultiplexer according to claim 14, wherein the third core is in the form of a linear shape.

18. An optical multiplexer/demultiplexer comprising at least a first core and a second core arranged in an optical waveguide,
wherein an end surface of the first core is arranged in opposed relation to a filter, the second core is arranged on the same side of the filter as the first core in such a manner as to be optically coupled to the first core through the filter, and the direction of the optical axis at the end portion of the first core far from the filter is not parallel to an end of the optical waveguide where the end surface of the first core is not located, and
wherein the relation holds that $0°<\theta 5<30°$, where $\theta 5$ is the angle formed between the direction of the optical axis at the end portion of the first core far from the filter and the end of the optical waveguide where the end surface of the first core is not located.

* * * * *